US009143627B2

(12) United States Patent
Tobita et al.

(10) Patent No.: US 9,143,627 B2
(45) Date of Patent: Sep. 22, 2015

(54) INFORMATION PROCESSING TERMINAL, DATA TRANSFER METHOD, AND PROGRAM

(75) Inventors: Naoto Tobita, Tokyo (JP); Shigeki Wakasa, Kanagawa (JP); Makoto Daicho, Tokyo (JP); Hiroaki Yamada, Tokyo (JP)

(73) Assignee: FeliCa Networks, Inc., Tokyo (JP)

( * ) Notice: Subject to any disclaimer, the term of this patent is extended or adjusted under 35 U.S.C. 154(b) by 401 days.

(21) Appl. No.: 12/056,924

(22) Filed: Mar. 27, 2008

(65) Prior Publication Data

US 2008/0244111 A1 Oct. 2, 2008

(30) Foreign Application Priority Data

Apr. 2, 2007 (JP) ................. P2007-096581

(51) Int. Cl.
*G06F 13/28* (2006.01)
*G06F 12/00* (2006.01)
*H04M 17/00* (2006.01)
*G06K 19/07* (2006.01)

(52) U.S. Cl.
CPC ........... *H04M 17/00* (2013.01); *G06K 19/0719* (2013.01); *G06K 19/0723* (2013.01)

(58) Field of Classification Search
CPC combination set(s) only.
See application file for complete search history.

(56) References Cited

U.S. PATENT DOCUMENTS

| | | | |
|---|---|---|---|
| 6,211,907 B1 * | 4/2001 | Scaman et al. ................. | 348/148 |
| 6,289,455 B1 * | 9/2001 | Kocher et al. ................. | 713/194 |
| 6,604,685 B1 * | 8/2003 | Norton .......................... | 235/492 |
| 6,732,234 B1 * | 5/2004 | Rowlands et al. ............. | 711/117 |
| 6,757,832 B1 * | 6/2004 | Silverbrook et al. ......... | 713/194 |
| 6,848,104 B1 * | 1/2005 | Van Ee et al. ................. | 719/310 |
| 7,007,111 B2 * | 2/2006 | Sihlbom et al. ................ | 710/36 |
| 7,055,038 B2 * | 5/2006 | Porter et al. ................... | 713/193 |
| 7,061,812 B2 * | 6/2006 | Shinagawa et al. ...... | 365/185.29 |
| 7,303,135 B2 * | 12/2007 | Nakabe et al. ................ | 235/492 |
| 7,360,019 B2 * | 4/2008 | Abe et al. ....................... | 711/114 |
| 7,457,897 B1 * | 11/2008 | Lee et al. ......................... | 710/74 |
| 7,590,688 B2 * | 9/2009 | Franke .......................... | 709/204 |
| 7,596,570 B1 * | 9/2009 | Emigh et al. ........................ | 1/1 |
| 7,788,452 B2 * | 8/2010 | Averill et al. ................. | 711/141 |
| 7,809,836 B2 * | 10/2010 | Mihm et al. ................... | 709/227 |
| 7,904,895 B1 * | 3/2011 | Cassapakis et al. .......... | 717/168 |
| 7,953,098 B2 * | 5/2011 | Takano et al. ................. | 370/401 |
| 2001/0049775 A1 * | 12/2001 | Rechberger et al. .......... | 711/154 |
| 2002/0065988 A1 * | 5/2002 | Lasserre et al. ............... | 711/122 |
| 2002/0178385 A1 * | 11/2002 | Dent et al. .................... | 713/202 |

(Continued)

FOREIGN PATENT DOCUMENTS

| | | |
|---|---|---|
| CN | 1317122 | 10/2001 |
| JP | 4-205418 | 7/1992 |

(Continued)

*Primary Examiner* — Henry Tsai
*Assistant Examiner* — Christopher Bartels
(74) *Attorney, Agent, or Firm* — Paratus Law Group, PLLC

(57) ABSTRACT

There is provided an information processing terminal that is provided with an IC chip that is capable of non-contact communication with a reader/writer. The information processing terminal includes a first storage portion, a second storage portion, and a data transfer portion. The first storage portion is provided within the IC chip and is capable of storing at least one type of data item that is used by the IC chip. The second storage portion is disposed outside the IC chip. The data transfer portion transfers the data item between the first storage portion and the second storage portion in accordance with a user input.

10 Claims, 11 Drawing Sheets

(56) References Cited

U.S. PATENT DOCUMENTS

| | | | |
|---|---|---|---|
| 2003/0028622 A1* | 2/2003 | Inoue et al. | 709/219 |
| 2003/0073412 A1* | 4/2003 | Meade, II | 455/70 |
| 2003/0174839 A1* | 9/2003 | Yamagata et al. | 380/270 |
| 2004/0049630 A1* | 3/2004 | Stark | 711/108 |
| 2004/0078338 A1* | 4/2004 | Ohta et al. | 705/51 |
| 2004/0087338 A1* | 5/2004 | Natsuno | 455/558 |
| 2004/0129787 A1* | 7/2004 | Saito et al. | 235/492 |
| 2004/0162932 A1* | 8/2004 | Mizushima et al. | 711/103 |
| 2004/0202073 A1* | 10/2004 | Lai et al. | 369/47.33 |
| 2004/0205314 A1* | 10/2004 | Babudri et al. | 711/163 |
| 2004/0230707 A1* | 11/2004 | Stavely et al. | 710/1 |
| 2004/0245335 A1* | 12/2004 | Al Amri | 235/384 |
| 2005/0071677 A1* | 3/2005 | Khanna et al. | 713/201 |
| 2005/0107157 A1* | 5/2005 | Wachtfogel et al. | 463/29 |
| 2005/0109841 A1* | 5/2005 | Ryan et al. | 235/380 |
| 2005/0246529 A1* | 11/2005 | Hunt et al. | 713/168 |
| 2005/0246767 A1* | 11/2005 | Fazal et al. | 726/11 |
| 2005/0270173 A1* | 12/2005 | Boaz | 340/870.02 |
| 2006/0020744 A1* | 1/2006 | Sinclair et al. | 711/103 |
| 2006/0085648 A1* | 4/2006 | Cheston et al. | 713/182 |
| 2006/0095690 A1* | 5/2006 | Craddock et al. | 711/153 |
| 2006/0123186 A1* | 6/2006 | Loh et al. | 711/103 |
| 2006/0161739 A1* | 7/2006 | Genty et al. | 711/152 |
| 2007/0005572 A1* | 1/2007 | Schluessler et al. | 707/3 |
| 2007/0011491 A1* | 1/2007 | Govindarajan et al. | 714/27 |
| 2007/0041285 A1* | 2/2007 | Iwami | 369/30.32 |
| 2007/0083354 A1* | 4/2007 | Collins et al. | 703/23 |
| 2007/0135164 A1* | 6/2007 | Lee | 455/558 |
| 2007/0187266 A1* | 8/2007 | Porter et al. | 206/232 |
| 2007/0198436 A1* | 8/2007 | Weiss | 705/75 |
| 2007/0276994 A1* | 11/2007 | Caulkins et al. | 711/113 |
| 2008/0108435 A1* | 5/2008 | Nelson et al. | 463/42 |
| 2008/0155695 A1* | 6/2008 | Fujioka et al. | 726/24 |
| 2008/0228850 A1* | 9/2008 | Samuels et al. | 709/201 |
| 2008/0250195 A1* | 10/2008 | Chow et al. | 711/103 |
| 2008/0281485 A1* | 11/2008 | Plante et al. | 701/35 |
| 2010/0325326 A1* | 12/2010 | Huang et al. | 710/110 |
| 2011/0072297 A1* | 3/2011 | Huang | 713/500 |
| 2011/0225339 A1* | 9/2011 | Chen | 710/313 |
| 2012/0072628 A1* | 3/2012 | Crockett et al. | 710/110 |

FOREIGN PATENT DOCUMENTS

| | | |
|---|---|---|
| JP | 8-30398 | 2/1996 |
| JP | 2000-307533 | 11/2000 |
| JP | 2003-309485 | 10/2003 |
| JP | 2004-54428 | 2/2004 |
| JP | 2004-318856 | 11/2004 |
| JP | 3614480 | 11/2004 |
| JP | 2004-048180 | 12/2004 |
| JP | 2004-341634 | 12/2004 |
| JP | 2005-11211 | 1/2005 |
| WO | WO2006/016465 | 2/2006 |

* cited by examiner

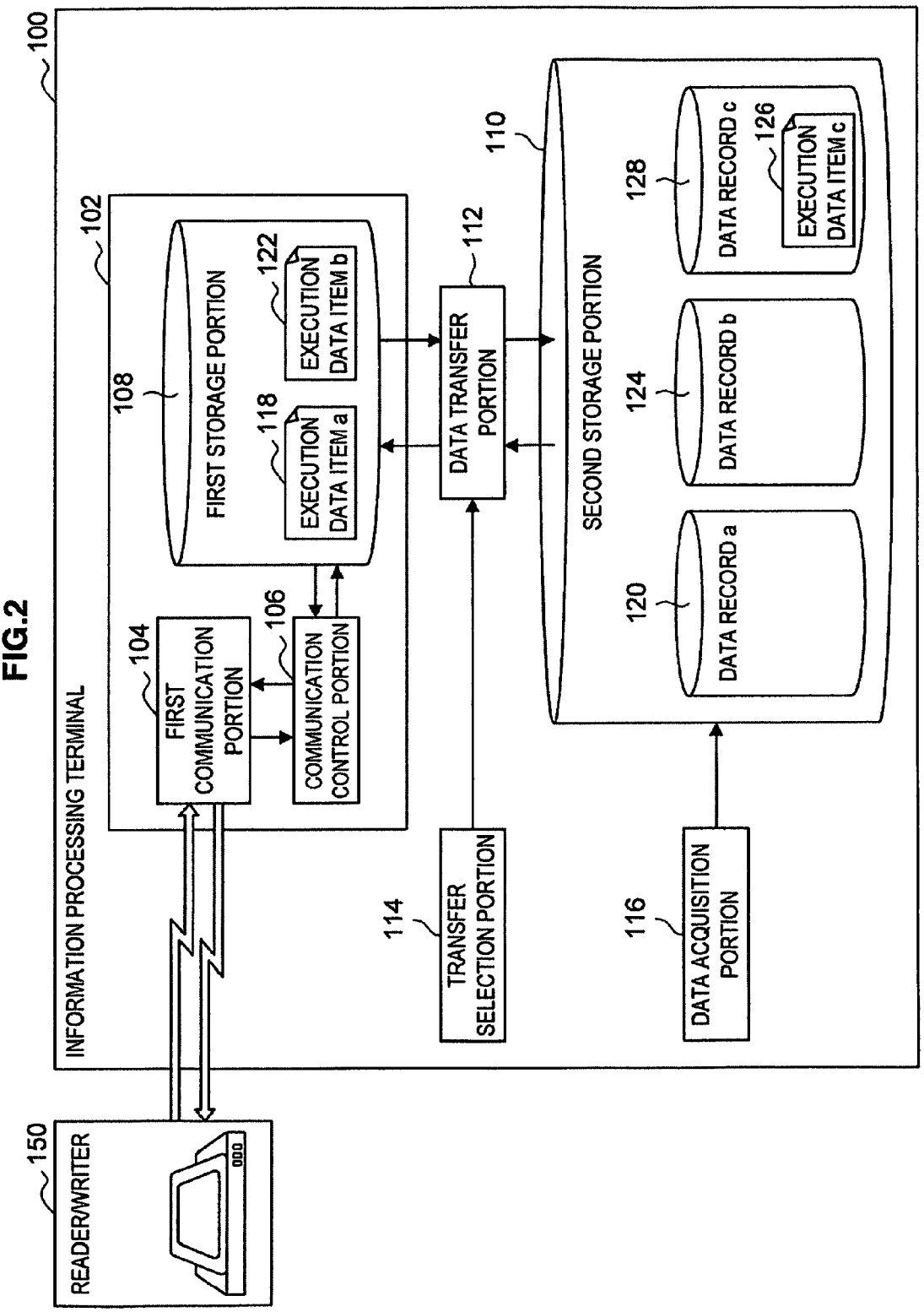

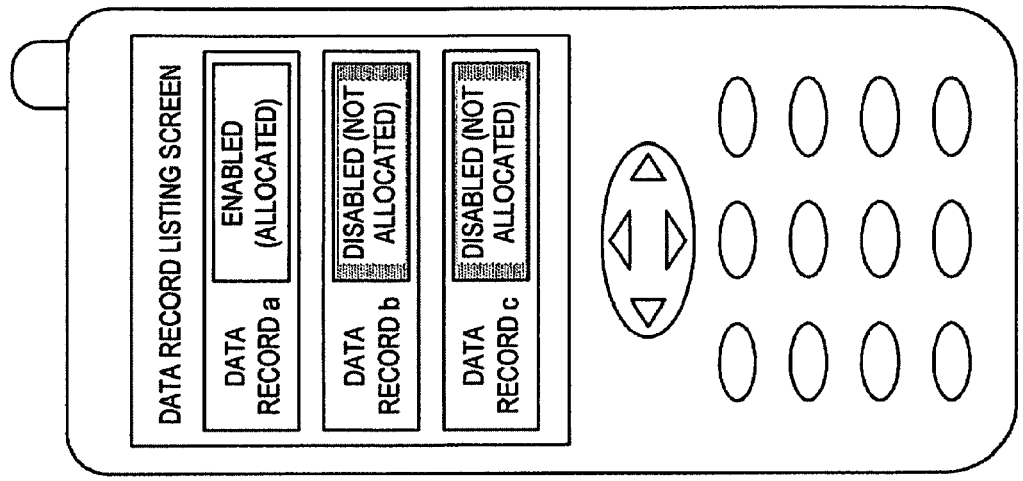
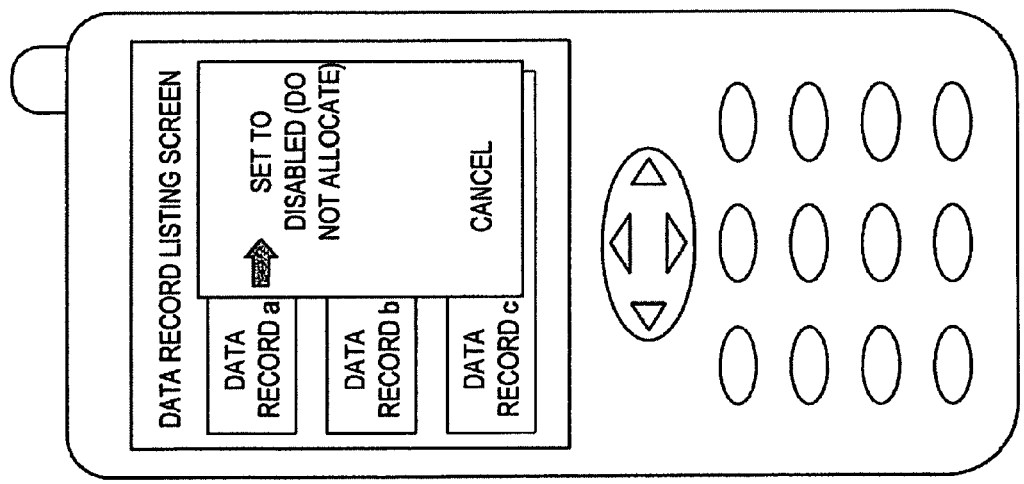
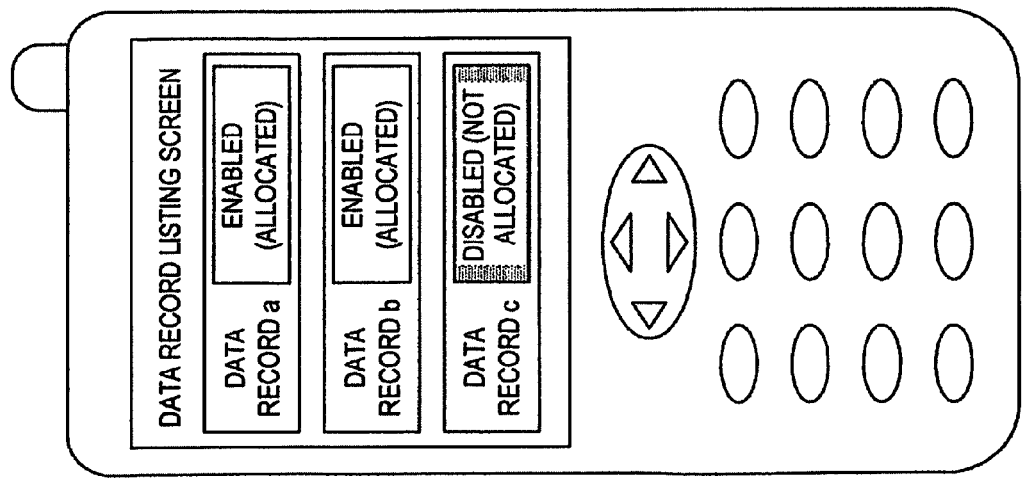

FIG.5

| | DATA NAME | EXECUTION DATA | DATA RECORD DISPLAY DEFINITION | DATA RECORD DISPLAY FRAME | ENCODING DEFINITION | SERVICE | SERVICE TYPE | CLASSIFI-CATION | DISTRIBUTION RULE | ACQUISI-TION SOURCE | PROTEC-TION LEVEL | STORAGE SITE | STORAGE LOCATION IN FIRST STORAGE PORTION |
|---|---|---|---|---|---|---|---|---|---|---|---|---|---|
| 1 | TR VS. SL GAME, 2006/11/30, OUTFIELD SEAT | 0x1110··· | <TITLE>XXX</TITLE>··· | 1 | ADDRESS, SIZE, TYPE, ... | P GUIDE | OFFICIAL | TICKET | DISAPPROVED | www ... | HIGH | FIRST STORAGE PORTION (WITH KEY) | 1 |
| 2 | 20% OFF DISCOUNT COUPON TO U TAVERN FOR XX COMPANY | 0x0110··· | <TITLE>XXX</TITLE>··· | 2 | ADDRESS, SIZE, TYPE, ... | G NAVIGATION | OFFICIAL (NOT PUBLICIZED) | COUPON | DISAPPROVED | www ... | LOW | FIRST STORAGE PORTION (WITHOUT KEY) | 7 |
| 3 | 20% OFF DISCOUNT COUPON TO W TAVERN | 0x1101··· | <TITLE>XXX</TITLE>··· | 2 | ADDRESS, SIZE, TYPE, ... | W TAVERN | OFFICIAL | COUPON | UNLIMITED DISTRIBUTION | www ... | LOW | SECOND STORAGE PORTION | — |
| 4 | S CAFÉ DISCOUNT COUPON | 0x1001··· | <TITLE>XXX</TITLE>··· | 2 | ADDRESS, SIZE, TYPE, ... | S CAFÉ COUPON | OFFICIAL | COUPON | PRIMARY DISTRIBUTION ONLY APPROVED | www ... | LOW | SECOND STORAGE PORTION | — |
| 5 | ADMISSION CARD TO BUILDING A | 0x0111··· | <TITLE>XXX</TITLE>··· | 5 | ADDRESS, SIZE, TYPE, ... | BUILDING M SERVICE | OFFICIAL (NOT PUBLICIZED) | ADMISSION CARD | DISAPPROVED | — | HIGH | FIRST STORAGE PORTION (WITH KEY) | 2 |
| 6 | NOTICE OF BARGAIN ON S MITT | — | <TITLE>XXX</TITLE>··· | 8 | — | S MITT | UNOFFICIAL | NOTICE | UNLIMITED DISTRIBUTION | www ... | LOW | SECOND STORAGE PORTION | — |
| n | BUSINESS CARD | 0x1001··· | <TITLE>XXX</TITLE>··· | 12 | ADDRESS, SIZE, TYPE, ... | BUSINESS CARD SERVICE FOR EVERYONE | OFFICIAL | BUSINESS CARD | 100 DISTRIBUTION CYCLES APPROVED | www ... | LOW | FIRST STORAGE PORTION (WITHOUT KEY) | 5 |

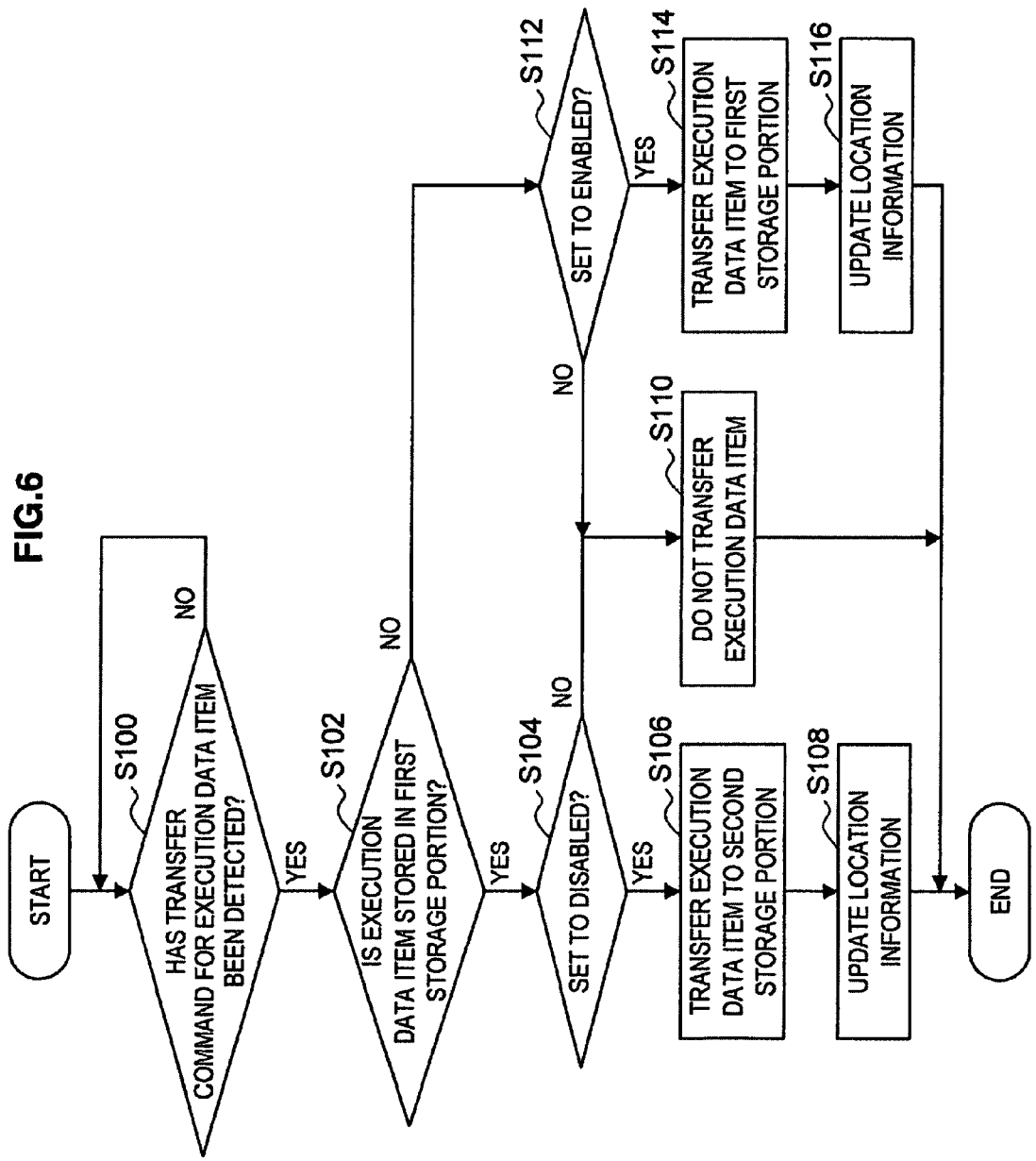

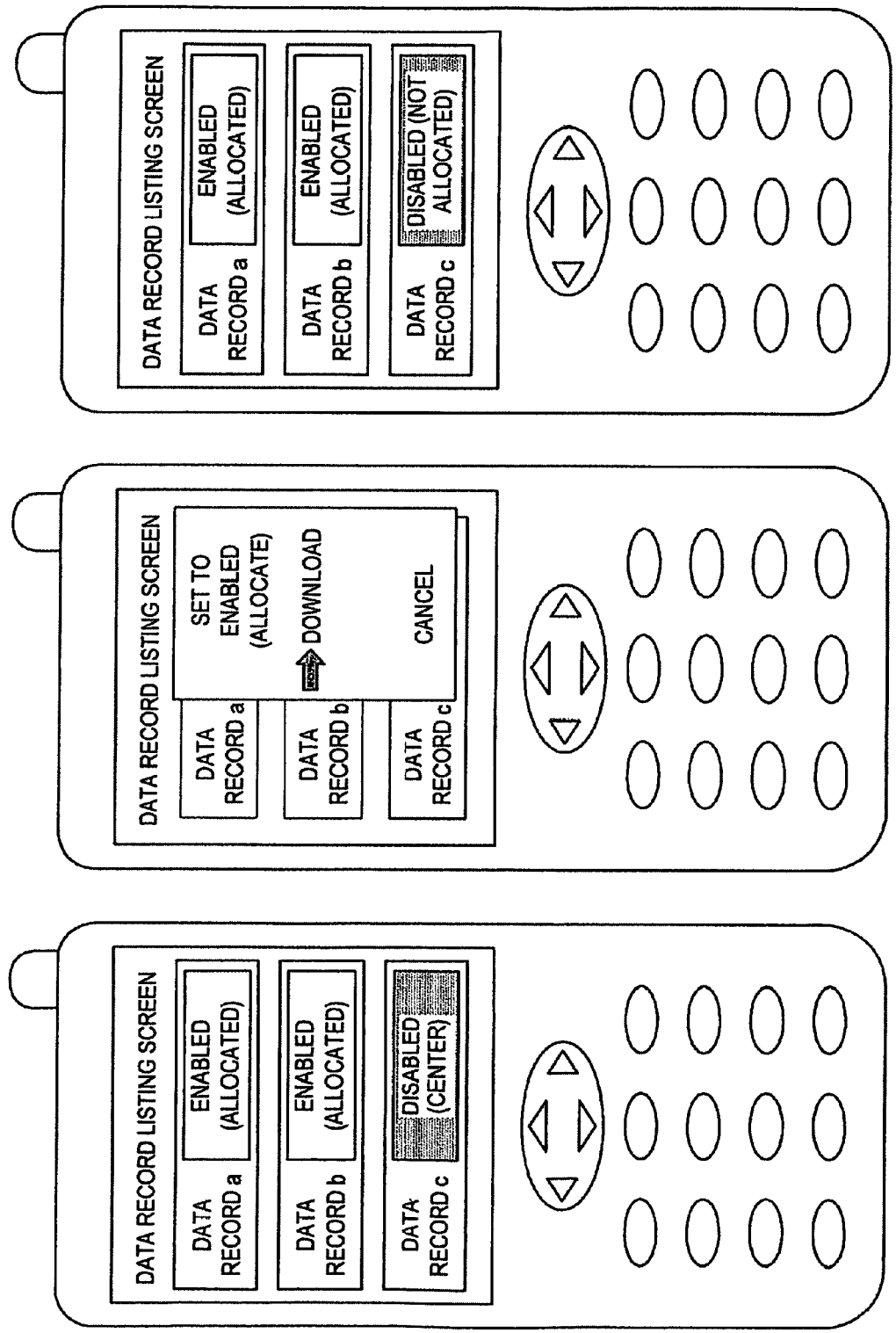

FIG.10

| | DATA NAME | EXECUTION DATA | DATA RECORD DISPLAY DEFINITION | DATA RECORD DISPLAY FRAME | ENCODING DEFINITION | SERVICE | SERVICE TYPE | CLASSIFI-CATION | DISTRIBUTION RULE | ACQUISI-TION SOURCE | PROTEC-TION LEVEL | STORAGE SITE | STORAGE LOCATION IN FIRST STORAGE PORTION |
|---|---|---|---|---|---|---|---|---|---|---|---|---|---|
| 1 | TR VS. SL GAME, 2006/11/30, OUTFIELD SEAT | 0x1110... | <TITLE>XXX</TITLE>... | 1 | ADDRESS, SIZE, TYPE,... | P GUIDE | OFFICIAL | TICKET | DISAPPROVED | WWW... | HIGH | FIRST STORAGE PORTION (WITH KEY) | 1 |
| 2 | 20% OFF DISCOUNT COUPON TO U TAVERN FOR XX COMPANY | 0x0110... | <TITLE>XXX</TITLE>... | 2 | ADDRESS, SIZE, TYPE,... | G NAVIGATION | OFFICIAL (NOT PUBLICIZED) | COUPON | DISAPPROVED | WWW... | LOW | FIRST STORAGE PORTION (WITHOUT KEY) | 7 |
| 3 | 20% OFF DISCOUNT COUPON TO W TAVERN | 0x1101... | <TITLE>XXX</TITLE>... | 2 | ADDRESS, SIZE, TYPE,... | W TAVERN | OFFICIAL | COUPON | UNLIMITED DISTRIBUTION | WWW... | LOW | SECOND STORAGE PORTION | — |
| 4 | S CAFÉ DISCOUNT COUPON | 0x1001... | <TITLE>XXX</TITLE>... | 2 | ADDRESS, SIZE, TYPE,... | S CAFÉ COUPON | OFFICIAL | COUPON | PRIMARY DISTRIBUTION ONLY APPROVED | WWW... | LOW | SECOND STORAGE PORTION | — |
| 5 | ADMISSION CARD TO BUILDING A | 0x0111... | <TITLE>XXX</TITLE>... | 5 | ADDRESS, SIZE, TYPE,... | BUILDING M SERVICE | OFFICIAL (NOT PUBLICIZED) | ADMISSION CARD | DISAPPROVED | — | HIGH | CONTROL INFORMATION PROCESSING DEVICE | — |
| 6 | NOTICE OF BARGAIN ON S MITT | — | <TITLE>XXX</TITLE>... | 8 | — | S MITT | UNOFFICIAL | NOTICE | UNLIMITED DISTRIBUTION | WWW... | LOW | SECOND STORAGE PORTION | — |
| n | BUSINESS CARD | 0x1001... | <TITLE>XXX</TITLE>... | 12 | ADDRESS, SIZE, TYPE,... | BUSINESS CARD SERVICE FOR EVERYONE | OFFICIAL | BUSINESS CARD | 100 DISTRIBUTION CYCLES APPROVED | WWW... | LOW | FIRST STORAGE PORTION (WITHOUT KEY) | 5 |

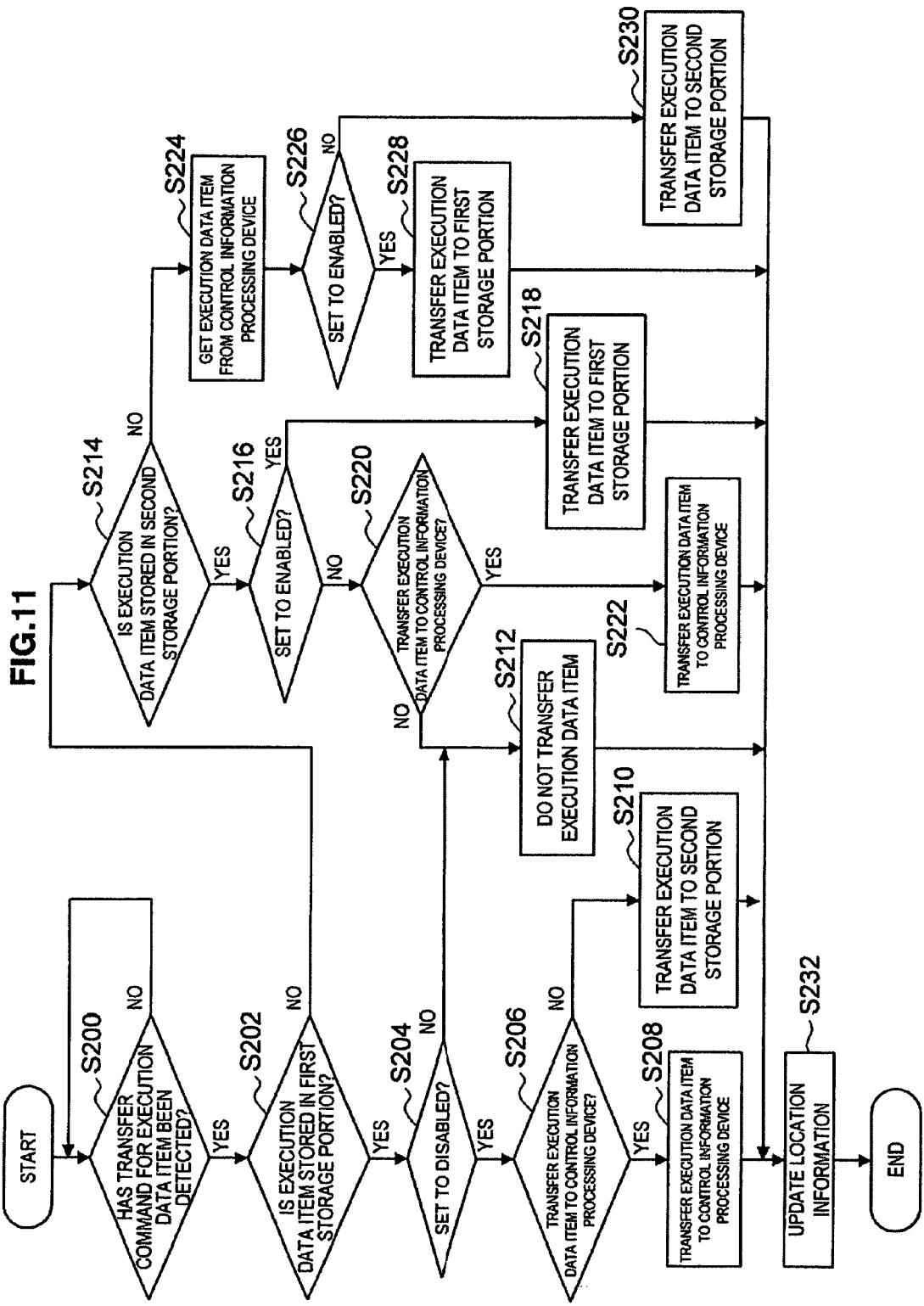

INFORMATION PROCESSING TERMINAL, DATA TRANSFER METHOD, AND PROGRAM

CROSS REFERENCES TO RELATED APPLICATIONS

The present invention contains subject matter related to Japanese Patent Application JP 2007-096581 filed in the Japan Patent Office on Apr. 2, 2007, the entire contents of which being incorporated herein by reference.

BACKGROUND OF THE INVENTION

1. Field of the Invention

The present invention relates to an information processing terminal, a data transfer method, and a program.

2. Description of the Related Art

In recent years, information processing terminals have come into widespread use that are capable of non-contact communication with a read/write unit (reader/writer), such as a mobile telephone or the like that is provided with a non-contact type integrated circuit (IC) card (hereinafter called by its generally used name "smart card") or a non-contact type IC chip.

The information processing terminal that is capable of non-contact communication with the reader/writer, such as the mobile telephone or the like that is provided with the non-contact type smart card or the non-contact type IC chip, has a storage portion from which the reader/writer can read and to which the reader/writer can write. The information processing terminal stores data items that pertain to various services and functions in the storage portion. Further, by reading and writing the data items that are stored in the storage portion, the reader/writer can provide various services to a user who uses the information processing terminal.

It is in this context that various technologies have been developed that utilize the information processing terminal that is capable of non-contact communication with the reader/writer. A technology that acquires information that is stored in the information processing terminal and stores the acquired information in a system is disclosed in Japanese Patent Application Publication No. JP-A-2004-54428, for example. Further, a technology that uses information that is acquired from the information processing terminal to issue a ticket is disclosed in Japanese Patent Application Publication No. JP-A-2005-11211, for example. Moreover, a technology that stores information such as a transaction history, electronic money, and the like in the information processing terminal and sells and redeems an electronic ticket is disclosed in Japanese Patent Publication No. 3614480, for example.

Known technologies that use the information processing terminal that is capable of non-contact communication with the reader/writer, such as the technologies disclosed in Japanese Patent Application Publication No. JP-A-2004-54428, Japanese Patent Application Publication No. JP-A-2005-11211, and Japanese Patent Publication No. 3614480, for example, are based on the assumption that the data items to be used are stored in the storage portion of the information processing terminal. Therefore, in a case where the data items to be used are not stored in the storage portion of the information processing terminal, the data items to be used must be stored anew by a process of item-by-item registration or the like.

SUMMARY OF THE INVENTION

However, there is a limit to the volume of data that can be stored (a volume restriction) in the storage portion from and to which the reader/writer can read and write in the known information processing terminal that is capable of non-contact communication with the reader/writer. Therefore, in the known information processing terminal, in a case where the information processing terminal tries to write more data to the storage portion when the storage portion already holds as much data as it is capable of storing, some of the already stored data must be deleted to open up space for storage. Moreover, in the known information processing terminal, in a case where the deleted data will be used again, the user must perform a process such as re-registration or the like, which imposes an excessive burden on the user who uses the information processing terminal.

The present invention addresses the problems described above and provides an information processing terminal, a data transfer method, and a program that are new and improved and that make it possible, through a user input, to allocate data selectively to the storage portion from and to which the reader/writer can read and write.

According to an embodiment of the present invention, there is provided an information processing terminal that is provided with an IC chip that is capable of non-contact communication with a reader/writer. The information processing terminal includes a first storage portion, a second storage portion, and a data transfer portion. The first storage portion is provided within the IC chip and is capable of storing at least one type of data item that is used by the IC chip. The second storage portion is disposed outside the IC chip. The data transfer portion transfers the data item between the first storage portion and the second storage portion in accordance with a user input.

The information processing terminal is a device that is provided with the IC chip that is capable of non-contact communication with the reader/writer, and the information processing terminal can include the first storage portion, the second storage portion, and the data transfer portion. The first storage portion is a storage portion that is provided within the IC chip, and the first storage portion can store at least one type of data item that is used by the IC chip. Providing the first storage portion within the IC chip makes it possible for the reader/writer to perform reading and writing of the data item that is stored in the first storage portion. The second storage portion is a storage portion that is disposed outside the IC chip, and the second storage portion can store at least one type of data item that is used by the IC chip. Because the second storage portion is disposed outside the IC chip, the reader/writer cannot perform reading and writing of the data item that is stored in the second storage portion. The data transfer portion can transfer the data item at least between the first storage portion and the second storage portion in accordance with the user input. This configuration makes it possible for the data item to be selectively allocated by the user input to the storage portion from and to which the reader/writer can read and write.

The first storage portion may also be tamper-proof.

This configuration makes it possible to restrict access to the data item that is stored in the first storage portion from outside the information processing terminal.

The data transfer portion may also identify the data item that will be transferred by using location information for each data item that indicates the location where the data item is stored.

This configuration makes it possible to identify the data item that will be transferred, even if the data transfer transferred the data item to an arbitrarily assigned location.

The data transfer portion may also update the location information for the transferred data item.

This configuration makes it possible to control the location where the data item is stored, even if the data transfer transferred the data item to an arbitrarily assigned location.

A communication portion may also be provided that performs communication with a control information processing device that is capable of storing the data item, and the data transfer portion may also transfer the data item between the first storage portion and the control information processing device and between the second storage portion and the control information processing device.

This configuration makes it possible for the transfer of the data item according to the user input to be carried out in a more flexible manner.

In a case where the data item is transferred from the first storage portion to the control information processing device, and in a case where the data item is transferred from the second storage portion to the control information processing device, the data transfer portion may delete the data item at the location from which the data item was transferred, based on a first completion notification that is transmitted from the control information processing device and that indicates that the storage of the data item in the control information processing device has been completed.

This configuration makes it possible to maintain the state prior to the transfer of the data item, even in a case where the transfer of the data item between the first storage portion and the control information processing device was not carried out in a normal manner and even in a case where the transfer of the data item between the second storage portion and the control information processing device was not carried out in a normal manner.

In a case where the data item is transferred from the control information processing device to first storage portion, and in a case where the data item is transferred from the control information processing device to second storage portion, the data transfer portion may transmit to the control information processing device a second completion notification that indicates that the data item has been stored in at least one of the first storage portion and the second storage portion and that the storage of the data item has been completed.

This configuration makes it possible to maintain the state prior to the transfer of the data item, even in a case where the transfer of the data item between the first storage portion and the control information processing device was not carried out in a normal manner and even in a case where the transfer of the data item between the second storage portion and the control information processing device was not carried out in a normal manner.

A data acquisition portion may also be provided that acquires the data item from an external device, and the data acquisition portion may also store the acquired data item in the second storage portion.

This configuration makes it possible to reduce the possibility that the data item that is used by the IC chip will not be able to be stored within the information processing terminal.

The data item may also be a data item that is transmitted from the reader/writer.

The information processing terminal may also be a mobile communication device.

According to the embodiments of the present invention described above, a data transfer method is provided in the information processing terminal that is provided with the IC chip that is capable of non-contact communication with the reader/writer, the first storage portion that is provided within the IC chip and that is capable of storing at least one type of data item that is used by the IC chip, and the second storage portion that is disposed outside the IC chip. The data transfer method includes a step of specifying, in accordance with the user input, the data item that will be transferred and the storage portion that will be a transfer destination where the data item that will be transferred will be stored. The data transfer method also includes a step of transferring the specified data item to the storage portion that is the transfer destination.

Using this method makes it possible for the data item to be selectively allocated by the user input to the storage portion from and to which the reader/writer can read and write.

According to the embodiments of the present invention described above, a program is provided for the information processing terminal that is provided with the IC chip that is capable of non-contact communication with the reader/writer, the first storage portion that is provided within the IC chip and that is capable of storing at least one type of data item that is used by the IC chip, and the second storage portion that is disposed outside the IC chip. The program includes instructions that command a computer to function as a portion that specifies, in accordance with the user input, the data item that will be transferred and the storage portion that will be a transfer destination where the data item that will be transferred will be stored. The program also includes instructions that command the computer to function as a portion that transfers the specified data item to the storage portion that is the transfer destination.

The program makes it possible for the data item to be selectively allocated by the user input to the storage portion from and to which the reader/writer can read and write.

According to the embodiments of the present invention described above, the data item can be selectively allocated by the user input to the storage portion from and to which the reader/writer can read and write.

BRIEF DESCRIPTION OF THE DRAWINGS

FIG. 2 is a block diagram that shows an information processing terminal according to a first embodiment of the present invention;

FIG. 3 is an explanatory figure for explaining an example of a transfer procedure for an execution data item b that is shown in FIG. 2;

FIG. 5 is an explanatory figure that shows an example of a control table according to the first embodiment of the present invention;

FIG. 6 is a flowchart that shows an example of a data transfer method according to the first embodiment of the present invention;

FIG. 9 is an explanatory figure for explaining an example of a transfer procedure according to the second embodiment of the present invention that transfers the execution data item from the control information processing device to the second storage portion;

FIG. 10 is an explanatory figure that shows an example of a control table according to the second embodiment of the present invention; and FIG. 11 is a flowchart that shows an example of a data transfer method according to the second embodiment of the present invention.

DETAILED DESCRIPTION OF THE PREFERRED EMBODIMENTS

Figure 1A:
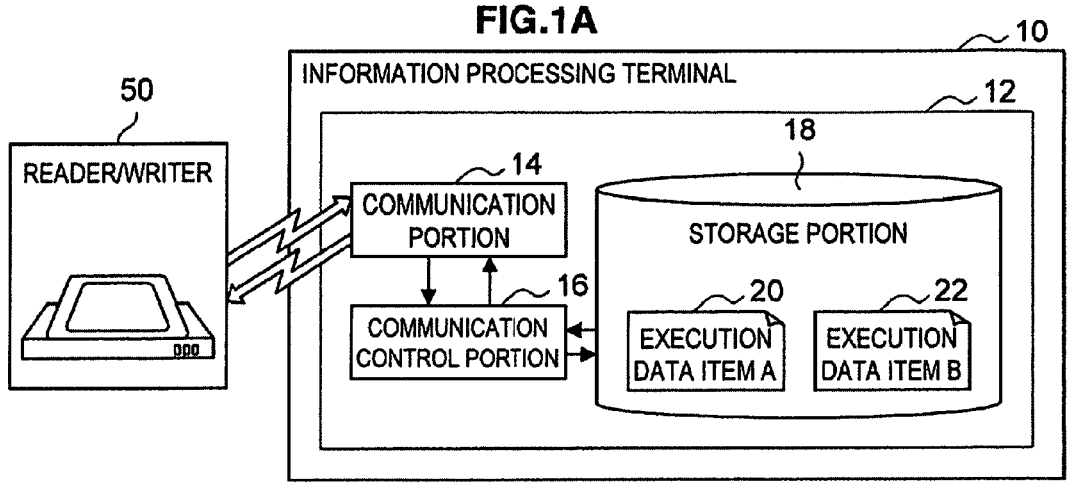
FIG. 1 is an explanatory figure for explaining problems in a known information processing terminal.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Problems in a Known Information Processing Terminal

First, problems that occur in a known information processing terminal will be explained. FIG. 1 is an explanatory figure for explaining the problems in a known information processing terminal 10.

Referring to FIG. 1A, the known information processing terminal 10 includes an IC chip 12 and performs non-contact communication with a reader/writer 50 by using a magnetic field (hereinafter called the "carrier wave") of a specific frequency, such as 13.56 MHz or the like, for example.

The IC chip 12 includes a communication portion 14, a communication control portion 16, and a storage portion 18. The communication portion 14 is a portion for performing the communication with the reader/writer 50 by using the carrier wave. By receiving the carrier wave that is transmitted from the reader/writer 50, the communication portion 14 receives various types of commands from the reader/writer 50, such as a data read command, a data write command, and the like, for example, and transmits and receives data to and from the reader/writer 50.

The communication control portion 16 controls the transmission and receiving in the communication portion 14 and performs reading of data from the storage portion 18 and writing of data to the storage portion 18 based on the various types of commands from the reader/writer 50.

The storage portion 18 can store the data (hereinafter called the "execution data item") that can be read and written based on the various types of commands from the reader/writer 50. The execution data item may be, for example, a data item for enabling a function that the information processing terminal 10 possesses, or a data item for receiving a service using the information processing terminal 10. Therefore, each execution data item that is stored in the storage portion 18 represents one function or service, for example, and the function or service that corresponds to the stored execution data item is enabled by the storing of the execution data item in the storage portion 18.

In FIG. 1A, two execution data items, an execution data item A 20 and an execution data item B 22, are stored in the storage portion 18. Therefore, the functions and/or services that correspond to the execution data item A 20 and the execution data item B 22 are enabled in the information processing terminal 10.

Physical Restrictions

However, there is a limit on the volume of the data that can be stored (hereinafter called the "storage volume") in the storage portion 18, and the number of the execution data items and the size of the execution data items that can be stored are also limited. For example, if the storage portion 18 of the information processing terminal 10 is set such that can store up to two execution data items, then in FIG. 1A, it is in a state in which those two data items have already been stored. Therefore, in the state shown in FIG. 1A, it is not possible to store an additional execution data item C 24.

Known Solution Method

Figure 1B:
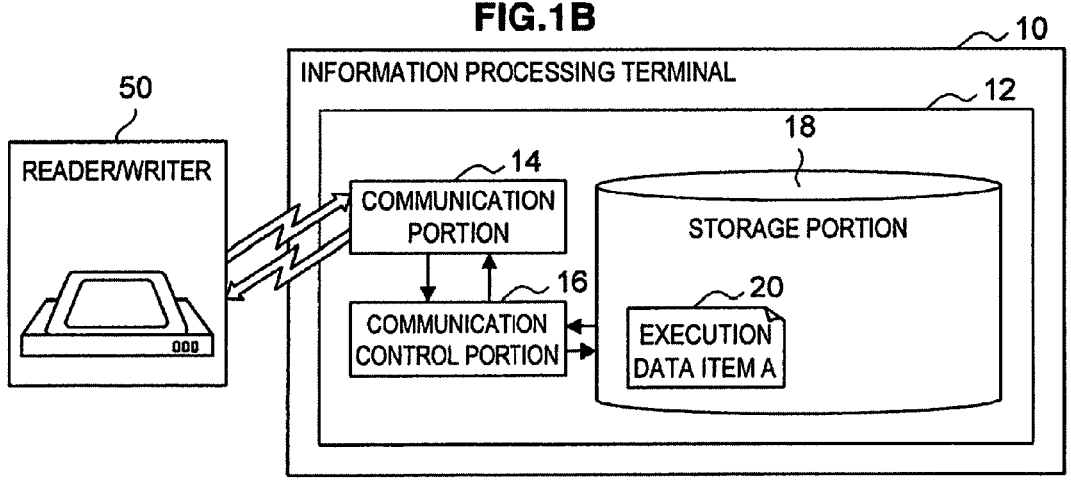
Figure 1C:
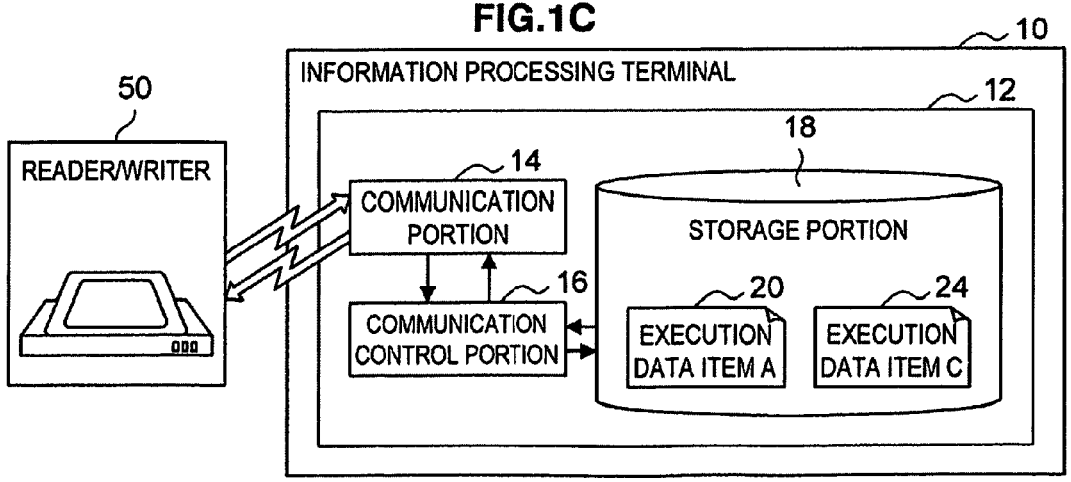

Accordingly, in the known information processing terminal 10, in a case where the additional execution data item C 24 will be stored when the state of the storage portion 18 is as shown in FIG. 1A, the execution data item B 22 is deleted to create a vacant area in the storage portion 18, as shown in FIG. 1B, for example. The execution data item C 24 is then stored in that vacant area, as shown in FIG. 1C.

Problems with the Known Solution Method

However, because the known solution method that is used in the information processing terminal 10 requires that the execution data item be deleted to create the vacant area in the storage portion 18, if the deleted execution data item is to be stored again in the storage portion 18, the deleted execution data item must once more be stored anew in the storage portion 18. In order for the execution data item to be stored anew in the storage portion 18 once more, a user must once more perform an operation, such as a user registration or the like, for example, in order to use the corresponding service. Therefore, with the known information processing terminal 10, cases occur in which a burden is imposed on the user, reducing the convenience of the information processing terminal 10 for the user.

First Embodiment

Accordingly, an information processing terminal according to an embodiment of the present invention will be explained next. FIG. 2 is a block diagram that shows an information processing terminal 100 according to a first embodiment of the present invention.

The information processing terminal 100 is a device that is capable of performing non-contact communication with a reader/writer 150 by using a magnetic field, that is, a carrier wave, of a specific frequency, such as 13.56 MHz or the like, for example. The information processing terminal 100 includes an IC chip 102, a second storage portion 110, a data transfer portion 112, a transfer selection portion 114, and a data acquisition portion 116. The information processing terminal 100 may also include a control portion (not shown in the drawings) that is configured from a micro processing unit (MPU) or the like and that controls the entire information processing terminal 100.

The IC chip 102 embodies in the form of an integrated circuit various portions that are involved in the communication with the reader/writer 150, and it can be made tamper-resistant. The IC chip 102 includes at least a first communication portion 104, a communication control portion 106, and a first storage portion 108. The IC chip 102 may also include an IC chip control portion (not shown in the drawings) that is configured from an MPU or the like, for example, and that controls the entire IC chip 102.

The first communication portion 104 is a portion for performing the communication with the reader/writer 150 by using the carrier wave. By receiving the carrier wave that is transmitted from the reader/writer 150, the first communication portion 104 receives various types of commands from the reader/writer 150, such as a data read command, a data write command, and the like, for example, and transmits and receives data to and from the reader/writer 150. The first communication portion 104 can, for example, be configured from a coil that functions as a transmitting and receiving antenna and has a prescribed inductance and from a resonance circuit that includes a capacitor that has a prescribed capacitance.

The communication control portion 106 is configured from an MPU, for example. The communication control portion 106 controls the transmission and receiving in the communication portion 104 and performs reading of data from the first storage portion 108 and writing of data to the first storage portion 108 based on the various types of commands from the reader/writer 150. The communication control portion 106 can vary the impedance of the information processing terminal 100 from the perspective of the reader/writer 150 by performing load modulation, for example. The reader/writer 150 can treat the variation in the impedance of the information processing terminal 100 from the perspective of the reader/writer 150 as a transmission of a signal from the information processing terminal 100 to the reader/writer 150.

The first storage portion 108 is a tamper-resistant storage portion that is provided within the IC chip 102 and that is capable of reading and writing data based on the various types of commands from the reader/writer 150. At least one type of data (hereinafter called the "execution data item") that is used by the IC chip 102 can be stored in the first storage portion 108. The execution data item may be, for example, a data item for enabling a function that the information processing terminal 100 possesses, or a data item for receiving a service using the information processing terminal 100. Examples of the execution data item according to the embodiments of the present invention include an electronic money value data item, a data item for certifying an individual, a ticket data item, a data item that corresponds to a discount coupon, and the like, but the execution data item is not limited to these examples. Furthermore, the execution data item according to the embodiments of the present invention may, for example, be transmitted from the reader/writer 150 and stored in the information processing terminal 100. The execution data item may also be transmitted by one of wire communication and wireless communication from an external device to the information processing terminal 100 and stored in the information processing terminal 100 by the data acquisition portion 116 (described later).

Each execution data item that is stored in the first storage portion 108 corresponds to one function or service, for example, and the storing of the execution data item in the first storage portion 108 makes it possible for the reader/writer 150 to read and write the execution data item. The storing of the execution data item in the first storage portion 108 therefore enables the function or service that corresponds to the stored execution data item. In FIG. 2, two execution data items, an execution data item a 118 and an execution data item b 122, are stored in the first storage portion 108.

The first storage portion 108 may be a non-volatile memory, such as a flash memory, a magnetoresistive random access memory (MRAM), a ferroelectric random access memory (FeRAM), a phase change random access memory (PRAM), or the like, but the first storage portion 108 is not limited to these examples.

Because the first storage portion 108 is a storage portion that is provided within the IC chip 102, its storage volume is limited to 4 kilobytes, 9 kilobytes, or the like, for example. Therefore, the first storage portion 108 is limited in terms of the number of execution data items that can be stored, the size of the individual data items, and the like. Note that for the purposes of the explanation that follows, an upper limit is set on the size of the individual data items such that the first storage portion 108 is capable of storing two execution data items, but it is obvious that the information processing terminal 100 according to the first embodiment of the present invention is not limited by this condition.

The second storage portion 110 is a second storage portion that is provided in the information processing terminal 100 outside the IC chip 102. A difference between the second storage portion 110 and the first storage portion 108 is, for example, that it is not possible to perform reading and writing of the data that is stored in the second storage portion 110 based on the various commands from the reader/writer 150. Therefore, as shown in FIG. 2, the second storage portion 110 does not have to be provided within the IC chip 102, so the second storage portion 110 can have a greater storage volume than the first storage portion 108. Note that it is obvious that the second storage portion 110 may also be provided within the IC chip 102.

The second storage portion 110 can also store the same sort of execution data item as the first storage portion 108, but as noted above, the reader/writer 150 cannot perform the reading and writing of the execution data item that is stored in the second storage portion 110. Therefore, with the information processing terminal 100, storing the execution data item in the second storage portion 110 makes it possible to disable the function or service that corresponds to the execution data item that is stored in the second storage portion 110. Note that the data item that is stored in the second storage portion 110 is not limited to the execution data item and that various types of data items, such as a data item for an application that the information processing terminal 100 can execute and the like, can also be stored in the second storage portion 110.

In FIG. 2, a data record a 120, a data record b 124, an execution data item c 126, and a data record c 128 are stored in the second storage portion 110. The data record a 120 is a data item or a cluster of a plurality of data items that is related to the execution data item a 118 that is stored in the first storage portion 108. The data record b 124 is related to the execution data item b 122. The data record c 128 is related to the execution data item c 126. Therefore, the reader/writer 150 cannot read the execution data item c 126 and cannot write the execution data item c 126, and the function or service that corresponds to the execution data item c 126 cannot be enabled in the information processing terminal 100.

The second storage portion 110 may be, for example, a magnetic storage medium such as a hard disk or the like, a non-volatile memory such as a flash memory or the like, or a magneto optical disk or the like, but the second storage portion 110 is not limited to these examples.

The data transfer portion 112 is a portion for transferring the execution data item and can transfer the execution data item based on a transfer command (described later) that is transmitted from the transfer selection portion 114. The data transfer portion 112 can be implemented in software, but it is not limited to this implementation and may also be implemented in hardware. The data transfer portion 112 can also be made an integral portion of the control portion (not shown in the drawings). Being provided with the data transfer portion 112 enables the information processing terminal 100 to transfer the execution data item that is stored in the first storage portion 108 and also enables the information processing terminal 100 to create a vacant area in the first storage portion 108, to transfer the execution data item to the created vacant area, and to store the execution data item in the first storage portion 108. Note that an execution data item transfer procedure will be described later.

The transfer selection portion 114 is an interface for allowing the user to select the execution data item to be transferred and to select a transfer destination for the selected execution data item. The user selections (user inputs) enable the transfer selection portion 114 to create the transfer command, which indicates the selected execution data item and the transfer destination. To enable the user to make the selections, the information processing terminal 100 can provide the transfer selection portion 114 with a display portion and an operation portion, for example. The display portion with which the transfer selection portion 114 is provided may be, for example, a liquid crystal display (LCD), an organic light emitting diode display (OLED), an organic electroluminescence display (organic EL display), a field emission display (FED), or the like. The operation portion with which the transfer selection portion 114 is provided may be, for example, a button, a direction key, a rotary type selector such as a jog dial or the like, a combination of these, or the like. Note that the transfer selection portion 114 is obviously not limited to these examples and the display portion and the operation portion may also be integrated into one portion, such as a touch screen or the like. Further, the transfer command that the transfer selection portion 114 creates can be a digital signal of a prescribed number of bits, for example, but it can also be an analog signal.

The data acquisition portion 116 is a portion for acquiring the execution data item that is transmitted from the external device (not shown in the drawings) and the data record that is related to the execution data item and for storing the execution data item and the data record in the information processing terminal 100. As shown in FIG. 2, the data acquisition portion 116 can store the execution data item that is transmitted from the external device (not shown in the drawings) and the data record that is related to the execution data item in the second storage portion 110. As described above, the second storage portion 110 can have a storage volume that is larger than that of the first storage portion 108. Therefore, storing in the first storage portion 110 the execution data item and the data record that is related to the execution data item, which were acquired by the data acquisition portion 116, lowers the possibility that the execution data item and the data record that is related to the execution data item cannot be stored in the information processing terminal 100. Note that it is obvious that the data acquisition portion 116 may also store the execution data item and the data record that is related to the execution data item in the first storage portion 108.

The data acquisition portion 116 can also be provided with a data acquisition and communication portion for performing communication with the external device (not shown in the drawings) and acquiring the execution data item and the data record that is related to the execution data item. The data acquisition portion 116 can also be provided with a data writing portion for storing the acquired execution data item and data record that is related to the execution data item. The data acquisition and communication portion that the data acquisition portion 116 has is a portion for performing wire communication and/or wireless communication with the external device (not shown in the drawings). The data acquisition and communication portion can have a form and functions that match the form of the communication with the external device (not shown in the drawings). The data writing portion with which the data acquisition portion 116 is provided can, for example, be implemented in software for writing to the second storage portion 110 the execution data item and the data record that is related to the execution data item that were acquired by the data acquisition and communication portion, but the data writing portion is not limited to this implementation and may also be implemented in hardware.

Example of the Execution Data Item Transfer Procedure According to the First Embodiment An example of the execution data item transfer procedure according to the first embodiment of the present invention in a case where the storage state of the execution data item is changed from a state (1) below to a state (2) below will be explained with reference to FIGS. 3 and 4.

(1) The first storage portion 108 contains the execution data item a 118 and the execution data item b 122 (the state shown in FIG. 2).

The second storage portion 110 contains the execution data item c 126 (the state shown in FIG. 2).

(2) The first storage portion 108 contains the execution data item a 118 and the execution data item c 126.

The second storage portion 110 contains the execution data item b 122.

FIG. 3 is an explanatory figure for explaining the example of the transfer procedure for the execution data item b 122. FIG. 4 is an explanatory figure for explaining the example of the transfer procedure for the execution data item c 126.

Figure 4C:
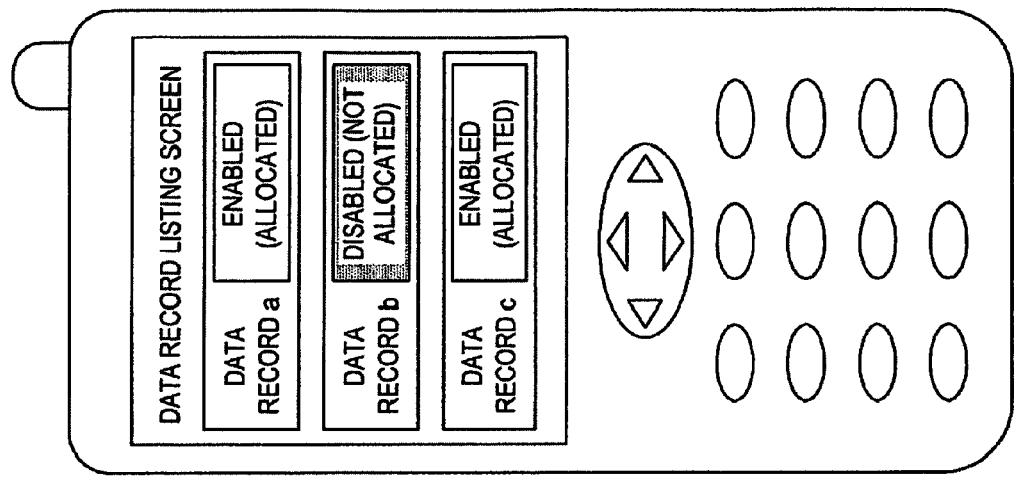
FIG. 4 is an explanatory figure for explaining an example of a transfer procedure for an execution data item c that is shown in FIG. 2.
Figure 4B:
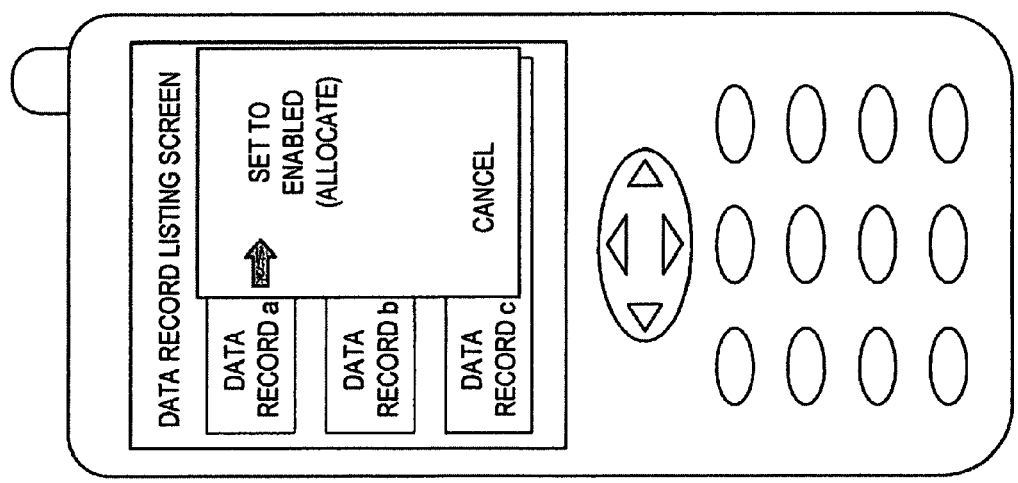
Figure 4A:
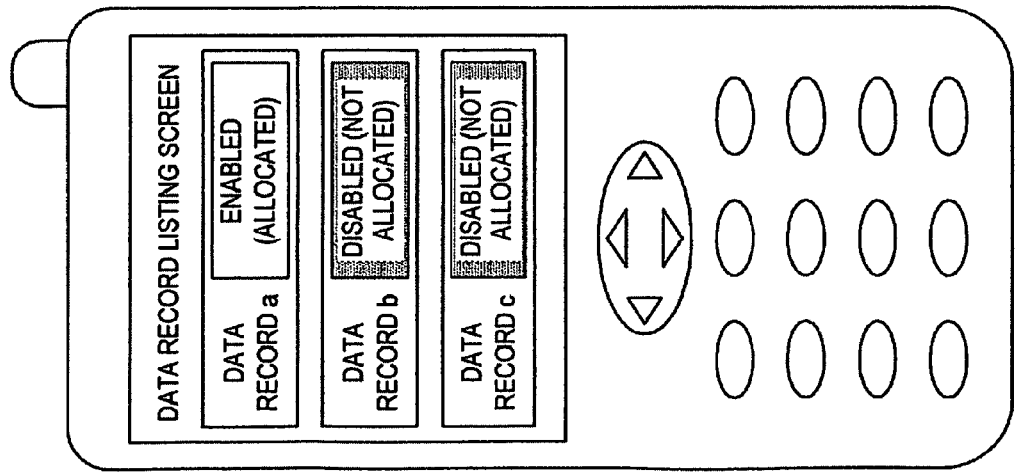

In FIGS. 3 and 4, the data record a indicates the function or service that corresponds to the execution data item a 118. In the same manner, the data record b and the data record c correspond respectively to the execution data item b 122 and the execution data item c 126. Further, in FIGS. 3 and 4, "Enabled (Allocated)" and "Disabled (Not allocated)" are status information indicating the locations where the respective execution data items are stored. "Enabled (Allocated)" indicates that the execution data item is stored in the first storage portion 108, while "Disabled (Not allocated)" indicates that the execution data item is stored in the second storage portion 110. Therefore, in a case where the status of the data record is "Disabled (Not allocated)", it is not possible for the reader/writer 150 to read and write the execution data item that corresponds to the data record, so the function or service indicated by the data record is in a disabled state. Note that FIGS. 3A to 3C and FIGS. 4A to 4C respectively show examples of the transfer selection portion 114. It is obvious that the transfer selection portion 114 according to the embodiments of the present invention is not limited by FIGS. 3 and 4.

Transfer of the Execution Data Item b 122: Creation of the Vacant Area (i) State of the Execution Data Item b 122 Before the Transfer First, the transfer of the execution data item b 122 will be explained. FIG. 3A is a figure that shows the state of the execution data item b 122 before the transfer, which is the state (1) described above. FIG. 3A shows the state in which two of the execution data items are stored in the first storage portion 108, that is, the state in which there is no vacant area in the first storage portion 108. Therefore, in order for an additional execution data item to be stored, the vacant area must be created in the first storage portion 108.

(ii) Selection of the Execution Data Item to be Transferred and Determination of the Transfer Destination FIG. 3B shows an example of a procedure for selecting the execution data item to be transferred and determining the transfer destination. For example, if the user selects the data record b by pressing various buttons, a menu screen is displayed that shows the transfer destination, as shown in FIG. 3B. If the user selects the transfer destination "Set to disabled (Do not allocate)" on the menu screen, such as by pressing various buttons, for example, a transfer command that indicates the selected execution data item and the transfer destination is transmitted to the data transfer portion 112. Then, based on the transfer command, the data transfer portion 112 transfers the execution data item b 122, which corresponds to the data record b, from the first storage portion 108 to the second storage portion 110.

(iii) State of the Execution Data Item b 122 After the Transfer

FIG. 3C is a figure that shows the state of the execution data item b 122 after the transfer. The transfer of the execution data item b 122 by the data transfer portion 112 from the first storage portion 108 to the second storage portion 110 creates the vacant area in the first storage portion 108.

Moreover, as shown in FIG. 3C, the status of the data record b has changed from "Enabled (Allocated)" to "Disabled (Not allocated)". By displaying the statuses of the various data records as described above, the information processing terminal 100 can notify the user as to whether or not the function or service that corresponds to each data record is enabled, that is, can notify the user of the storage state of each of the execution data items.

Transfer of the Execution Data Item c 126: Storage of the Execution Data Item c 126 in the First Storage Portion 108

The transfer of the execution data item b 122 shown in FIG. 3 created the vacant area in the first storage portion 108. It is therefore possible to store a new execution data item in the first storage portion 108. Accordingly, next a procedure will be explained that transfers the execution data item c 126 from the first storage portion 110 to the first storage portion 108 and stores the execution data item c 126 in the first storage portion 108.

(i) State of the Execution Data Item c 126 Before the Transfer

FIG. 4A is a figure that shows the state of the execution data item c 126 before the transfer, which is the same as the state shown in FIG. 3C, that is, the state in which the vacant area exists in the first storage portion 108.

(ii) Selection of the Execution Data Item to be Transferred and Determination of the Transfer Destination FIG. 4B shows an example of a procedure for selecting the execution data item to be transferred and determining the transfer destination. For example, if the user selects the data record c by pressing various buttons, a menu screen is displayed that shows a transfer destination, in the same manner as in FIG. 3B. If the user selects the transfer destination "Set to enabled (Allocate)" on the menu screen, such as by pressing various buttons, for example, a transfer command that indicates the execution data item to be transferred and the transfer destination is transmitted to the data transfer portion 112. Then, based on the transfer command, the data transfer portion 112 transfers the execution data item c 126, which corresponds to the data record c, from the second storage portion 110 to the first storage portion 108.

(iii) State of the Execution Data Item c 126 After the Transfer

FIG. 4C shows the state of the execution data item c 126 after the transfer. The transfer of the execution data item c 126 by the data transfer portion 112 from the second storage portion 110 to the first storage portion 108 brings into being the state (2) described above.

Further, as shown in FIG. 4C, the status of the data record c has changed from "Disabled (Not allocated)" to "Enabled (Allocated)". Therefore, by displaying the statuses of the individual data records, the information processing terminal 100 can notify the user as to whether or not the function or service that corresponds to each data record is enabled, that is, can notify the user of the storage state of each of the execution data items.

As explained with reference to FIGS. 3 and 4, the user's operation of the transfer selection portion 114, for example, can cause the transfer command, which indicates the execution data item to be transferred and the transfer destination, to be transmitted to the data transfer portion 112, such that the data transfer portion 112 can transfer the execution data item based on the transfer command. Therefore, being provided with the data transfer portion 112 enables the information processing terminal 100 according to the first embodiment of the present invention to transfer the execution data item to an arbitrarily assigned area in the first storage portion 108 and to an arbitrarily assigned area in the second storage portion 110.

However, in a case where the execution data item is transferred to an arbitrarily assigned area in the first storage portion 108, the information processing terminal 100 cannot identify the area in the first storage portion 108 in which the execution data item that the reader/writer 150 reads or writes is stored. Therefore, even if the execution data item is stored in the first storage portion 108, the possibility exists that the function or service that corresponds to the execution data item cannot be enabled.

Moreover, in a case where the execution data item has been transferred to an arbitrarily assigned area, if the information processing terminal 100 transfers the transferred execution data item once more, the possibility exists that the information processing terminal 100 will not be able to identify where the transferred execution data item is stored.

Example of Control of the Execution Data Item in the Data Transfer Portion 112

Accordingly, the information processing terminal 100 according to the first embodiment of the present invention controls the execution data item as described in sections (A) and (B) below, for example.

(A) Control Using an Address Area

In order to identify the execution data item that the reader/writer 150 reads or writes, for example, the information processing terminal 100 can be provided with an address area in the first storage portion 108 that stores the location (numbered area) where the execution data item is stored in the first storage portion 108. The information that is stored in the address area may be, for example, an item ID for distinguishing the execution data item, a first storage portion storage location that indicates the numbered area in the first storage portion 108 where the execution data item is stored, and the like, but the information is not limited to these examples.

If the address area is provided in the first storage portion 108 and if the information in the address area is updated appropriately when the execution data items are transferred, then when the reader/writer 150 reads one of the execution data items, for example, the reader/writer 150 will be able to read a specific execution data item.

(B) Control Using a Control Table

The information processing terminal 100 can also use a control table like that shown in FIG. 5, for example, to control each of the execution data items in conjunction with the transfer of the execution data items to the arbitrarily assigned areas. FIG. 5 is an explanatory figure that shows an example of the control table according to the first embodiment of the present invention.

Each line of the control table according to the first embodiment of the present invention corresponds to one function or service, and the control table contains at least location information that indicates the location where each of the execution data items is stored. In FIG. 5, the "Storage site", which indicates the location where the execution data item is stored, and the "Storage location in first storage portion", which indicates the numbered area in the first storage portion 108 where the execution data item is stored, fall under the category of the location information. The location information may also include, for example, information such as an area that requires an encryption key in order to be read (for example, "with key" in FIG. 5), an area that does not require an encryption key in order to be read (for example, "without key" in FIG. 5), and the like.

The control table according to the first embodiment of the present invention can also contain various types of information, as shown in FIG. 5. For example, the information can be the "Data name" and the "Execution data" for identifying the execution data item. The information can also include the "Data record display definition", the "Data record display frame", and the "Encoding definition" that are used for displaying the execution data item on the transfer selection portion 114. The information can also include the "Service" and the "Service type" for identifying the function or the service, the "Classification" for classifying the execution data item, the "Distribution rule" that prescribes a restriction on the distribution of the execution data item, the "Acquisition source" that indicates the source from which the execution data item was acquired, the "Protection level" that prescribes a protection level for the execution data item, and the like. Note that the control table according to the first embodiment of the present invention is obviously not limited by FIG. 5.

When transferring the execution data item, the data transfer portion 112 can determine where to store the execution data item by referring to the location information in the control table. After the execution data item has been stored, the data transfer portion 112 can update the transfer destination with the location information for the transferred execution data item. The data transfer portion 112 can also update the address area that is provided in the first storage portion 108 after the execution data item has been stored. The updating of the address area may be the addition, the modification, the deletion, or the like of information pertaining to the transferred execution data item. The updating of the address area that is provided in the first storage portion 108 may be performed by the data transfer portion 112, and it can also be performed by the IC chip control portion (not shown in the drawings) that is provided in the IC chip 102. Accordingly, in a case where the execution data item has been stored in the first storage portion 108, the execution data item information that is stored in the address area that is provided in the first storage portion 108 will match the contents of the location information in the control table.

It is therefore possible for the information processing terminal 100 to control where the execution data item is stored, so the information processing terminal 100 can transfer the execution data item to an arbitrarily assigned area and can also uniquely identify the execution data item that the reader/writer 150 reads and writes even if the execution data item has been transferred to an arbitrarily assigned area.

Note that the control table according to the first embodiment of the present invention can be stored in the first storage portion 110, but the storage portion for the control table is not thus limited. The data transfer portion 112 can be provided with a storage portion, and the control table can be stored in the storage portion that is provided in the data transfer portion 112. The storage portion that is provided in the data transfer portion 112 may be, for example, a magnetic storage medium such as a hard disk, a non-volatile memory such as a flash memory, or the like, but it is not limited to these examples.

Thus the information processing terminal 100 according to the first embodiment of the present invention is provided with the first storage portion 108 within the IC chip 102, the second storage portion 110 outside the IC chip 102, and the data transfer portion 112. Data can be read from and written to the first storage portion 108 based on various commands from the reader/writer 150. Data cannot be read from and written to the second storage portion 110 based on various commands from the reader/writer 150. The data transfer portion 112 transfers data based on the user input. Accordingly, it is possible for the information processing terminal 100 to transfer the execution data item freely between the first storage portion 108 and the second storage portion 110 according to the user's selection. The user of the information processing terminal 100 according to the first embodiment of the present invention can therefore freely enable and disable the functions and services that correspond to the respective execution data items.

Moreover, the information processing terminal 100 according to the first embodiment of the present invention does not have to delete the execution data items as the known information processing terminal 10 does, even in a case where no vacant area exists in the first storage portion 108. Accordingly, even in a case where an execution data item that is transferred from the first storage portion 108 is stored once again in the first storage portion 108, the user does not have to perform an operation such as a user registration or the like in order to use the service that corresponds to the execution data item, for example. Therefore, a burden such as the known information processing terminal 10 imposes is not imposed on the user of the information processing terminal 100 according to the first embodiment of the present invention, even in a case where a disabled function or service is once again enabled, and the user-friendliness of the information processing terminal 100 is not impaired.

Furthermore, the information processing terminal 100 according to the first embodiment of the present invention can control the location information that indicates the locations where the individual execution data items are stored. Therefore, the information processing terminal 100 according to the first embodiment of the present invention can transfer the execution data item to an arbitrarily assigned area and can also uniquely identify the location where the execution data item that the reader/writer 150 reads and writes is stored, even though the execution data item has been transferred to an arbitrarily assigned area.

The first embodiment of the present invention has been explained using the information processing terminal 100 as an example, but the first embodiment of the present invention is not limited to this example. The first embodiment of the present invention can also be used in a mobile communication device such as a mobile telephone, a Personal Handyphone System (PHS), or the like that is provided with a smart card or an IC chip, as well as in a computer or the like, such as a personal digital assistant (PDA) or the like that is provided with an IC chip.

Program According to the First Embodiment

A program that causes the information processing terminal 100 according to the first embodiment to function as a computer can allocate data selectively, according to a user input, to a storage portion from and to which a reader/writer can read and write.

Data Transfer Method According to the First Embodiment

Next, a data transfer method according to the first embodiment of the present invention will be explained. FIG. 6 is a flowchart that shows an example of the data transfer method according to the first embodiment of the present invention. Note that in FIG. 6, "first storage portion" denotes a storage portion within an IC chip, from and to which data can be read and written based on various commands from a reader/writer, and "second storage portion" denotes a storage portion outside the IC chip, from and to which data cannot be read and written based on various commands from the reader/writer. Therefore, in a case where the execution data item is stored in the first storage portion, the function or service that corresponds to the execution data item is in the enabled state.

The method determines whether or not a transfer command for the execution data item has been detected (step S100). The transfer command for the execution data item is information that indicates a transfer destination for the execution data item to be transferred, which was selected by a user's operation of an operation device such as a button or the like (a user input). If the transfer command is not detected at step S100, the method repeats step S100 until the transfer command is detected.

If the transfer command is detected at step S100, the method determines whether or not the execution data item indicated by the transfer command is stored in the first storage portion, in order to identify the location where the execution data item is stored (step S102). The determination at step S102 can be made by referring to the control table, for example, in which is recorded the location information that indicates the location where the execution data item is stored. Note that at step S102, the determination of whether the execution data item is stored in the first storage portion is shown, but the method is not limited by this example, and it is obvious that the method may also determine whether the execution data item is stored in the second storage portion.

If it is determined at step S102 that the execution data item indicated by the transfer command is stored in the first storage portion, the method then determines whether or not the execution data item will be set to disabled (step S104). The determination at step S104 can be made according to whether or not information for the transfer destination is included in the transfer command, for example.

In a case where it is determined at step S104 that the execution data item will be set to disabled, the method transfers the execution data item indicated by the transfer command from the first storage portion to the second storage portion (step S106), then updates the location information for the execution data item indicated by the transfer command from the first storage portion to the second storage portion (step S108). In conjunction with the updating of the location information at step S108, information can also be updated (for example, deleted) for the first storage portion address area that is associated with the transferred execution data item. In a case where it is determined at step S104 that the execution data item will not be set to disabled, the method does not transfer the execution data item indicated by the transfer command (step S110).

In a case where it is determined at step S102 that the execution data item indicated by the transfer command is not stored in the first storage portion, the method then determines whether or not the execution data item will be set to enabled (step S112). The determination at step S112 can be made in the same manner as the determination at step S104, according to whether or not the information for the transfer destination is included in the transfer command, for example.

In a case where it is determined at step S112 that the execution data item will be set to enabled, the method transfers the execution data item indicated by the transfer command from the second storage portion to the first storage portion (step S114), then updates the location information for the execution data item indicated by the transfer command from the second storage portion to the first storage portion (step S116). In conjunction with the updating of the location information at step S116, information can also be updated (for example, added) for the first storage portion address area associated with the transferred execution data item. In a case where it is determined at step S112 that the execution data item will not be set to enabled, the method does not transfer the execution data item indicated by the transfer command (step S110).

In this manner, the data transfer method according to the first embodiment of the present invention can transfer the execution data item between the first storage portion and the second storage portion based on the transfer command that indicates the execution data item to be transferred and the transfer destination. The transfer command can be created by the user operation (the user input), for example. Therefore, using the data transfer method according to the first embodiment of the present invention makes it possible to allocate the execution data item selectively, according to the user input, to the storage portion from and to which the reader/writer can read and write.

Furthermore, the data transfer method according to the first embodiment of the present invention, at the time that the execution data item is transferred, can update the location information that indicates the location where the execution data item is stored. Therefore, using the data transfer method according to the first embodiment of the present invention makes it possible to transfer the execution data item to an arbitrarily assigned area and also makes it possible to identify uniquely the location where the execution data item that the reader/writer reads and writes is stored, even if the execution data item has been transferred to an arbitrarily assigned area.

Second Embodiment

A configuration was explained above, as the information processing terminal according to the first embodiment of the present invention, in which the execution data item can be transferred within the information processing terminal. However, the information processing terminal according to the embodiments of the present invention is not limited to the configuration in which the execution data item can be transferred within the information processing terminal. Accordingly, an information processing terminal according to a second embodiment will be explained next. The information processing terminal according to the second embodiment can communicate with an external device and transfer the execution data item to and from the external device.

Figure 7:
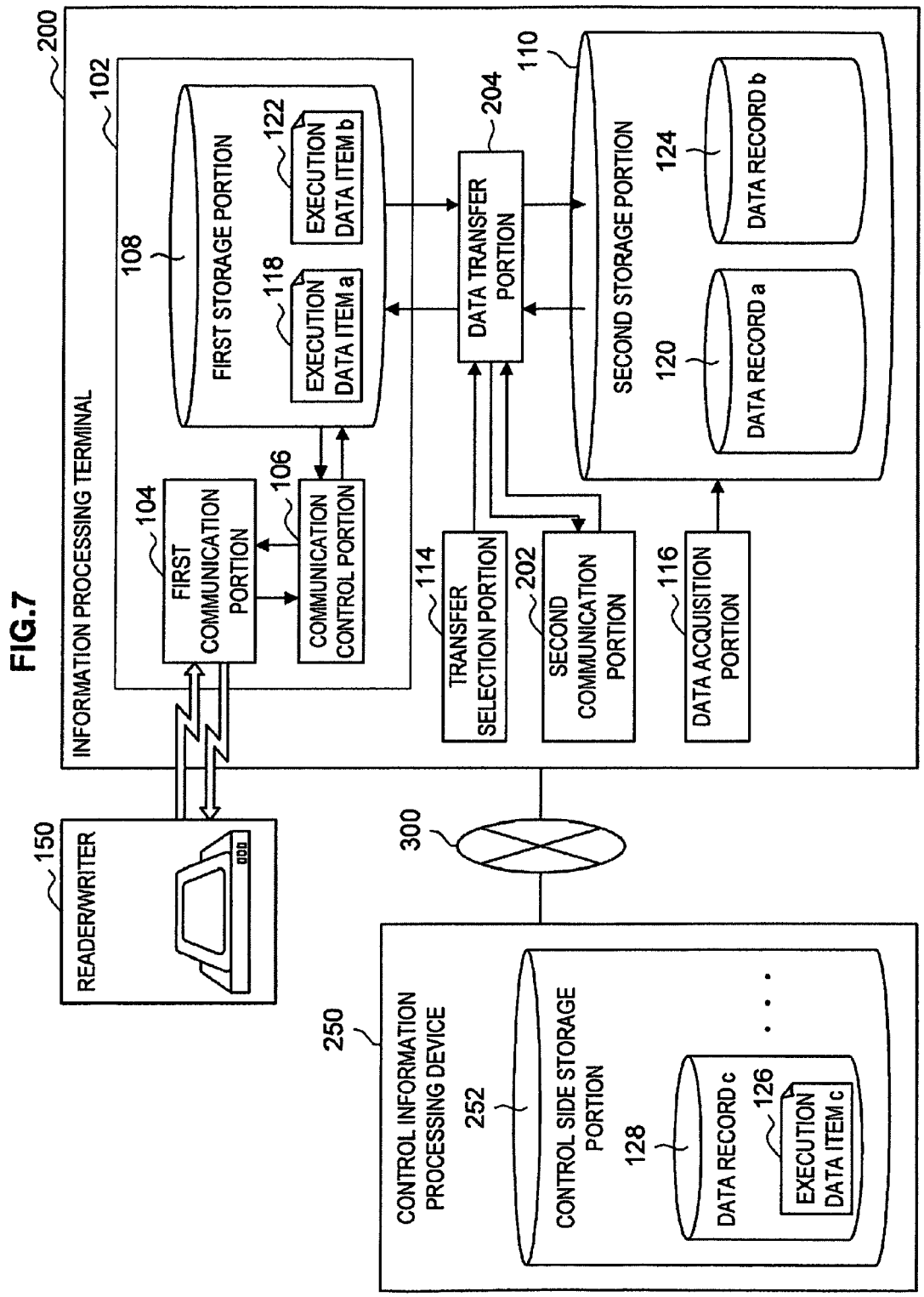
FIG. 7 is an explanatory figure that shows a system that includes an information processing terminal according to a second embodiment of the present invention.

FIG. 7 is an explanatory figure that shows a system that includes an information processing terminal 200 according to the second embodiment of the present invention.

Referring to FIG. 7, the system that includes the information processing terminal 200 according to the second embodiment of the present invention includes the information processing terminal 200, a reader/writer 150, and a control information processing device 250. The information processing terminal 200 and the control information processing device 250 are connected by a network circuit 300. The network circuit 300 may be a wired network such as a local area network (LAN), a wide area network (WAN), or the like, or a wireless network such as a wireless local area network (WLAN) or the like that uses multiple-input and multiple-output (MIMO). The network circuit 300 may also be the Internet and utilize a communications protocol such as the Transmission Control Protocol/Internet Protocol (TCP/IP), and it may also be a network that is connected via a base station or the like that fulfills the role of a so-called wireless LAN access point, but the network circuit 300 is not limited to these examples.

The information processing terminal 200 has basically the same configuration as the information processing terminal 100 according to the first embodiment of the present invention. Therefore, the information processing terminal 200 can transfer the execution data item freely between a first storage portion 108 and a second storage portion 110 according to a user's selection, in the same manner as the information processing terminal 100.

Unlike the information processing terminal 100, the information processing terminal 200 also includes a second communication portion 202. The second communication portion 202 is a portion that performs communication with the external device, such as the control information processing device 250, through the network circuit 300 and can transmit and receive the execution data items and the data records to and from the control information processing device 250. In order to make it possible for the execution data items and the data records to be transmitted to and received from the control information processing device 250, a data transfer portion 204 is provided with a function that transfers to the control information processing device 250 the execution data items and the data records that are stored in the first storage portion 108 and the second storage portion 110 and a function that stores in the first storage portion 108 and the second storage portion 110 the execution data items and the data records that are transmitted from the control information processing device 250.

The reader/writer 150 performs non-contact communication with the information processing terminal 200 using a carrier wave, for example, and reads and writes the data that are stored in the first storage portion 108.

The control information processing device 250 includes a control side storage portion 252. The control information processing device 250 may also be provided with a control portion (not shown in the drawings) that is configured from an MPU or the like and that controls the entire control information processing device 250, a communication portion (not shown in the drawings) for performing communication with the information processing terminal 200, and an operation portion (not shown in the drawings), or the like.

The control side storage portion 252 is a storage portion that is provided in the control information processing device 250. The control side storage portion 252 may be, for example, a magnetic storage medium such as a hard disk or the like, a non-volatile memory such as a flash memory or the like, or a magneto optical disk or the like, but the control side storage portion 252 is not limited to these examples.

Further, the control side storage portion 252 can store the execution data items and the data records. For example, in FIG. 7, an execution data item c 126 and a data record c 128 that is related to the execution data item c 126 are stored in the control side storage portion 252.

As shown in FIG. 7, the system that includes the information processing terminal 200 according to the second embodiment of the present invention can transfer the execution data item to the control information processing device 250, which is a device that is external to the information processing terminal 200.

First Example of an Execution Data Item Transfer Procedure According to the Second Embodiment: Transfer of the Execution Data Item to the Control Information Processing Device 250

A first example of an execution data item transfer procedure according to the second embodiment of the present invention in a case where the storage state of the execution data item is changed from a state (3) below to a state (4) below will be explained with reference to FIG. 8.

(3) The First Storage Portion 108 Contains the Execution Data Item a 118 and the Execution Data Item b 122.

The second storage portion 110 contains the execution data item c 126.

The control side storage portion 252 is empty.

(4) The First Storage Portion 108 Contains the Execution Data Item a 118 and the Execution Data Item b 122 (the State Shown in FIG. 7).

The second storage portion 110 is empty (the state shown in FIG. 7).

The control side storage portion 252 contains the execution data item c 126 (the state shown in FIG. 7).

FIG. 8 is an explanatory figure for explaining an example of the transfer procedure according to the second embodiment of the present invention that transfers the execution data item from the second storage portion 110 to the control side storage portion 252.

(i) State of the Execution Data Item c 126 Before the Transfer

Figure 8C:
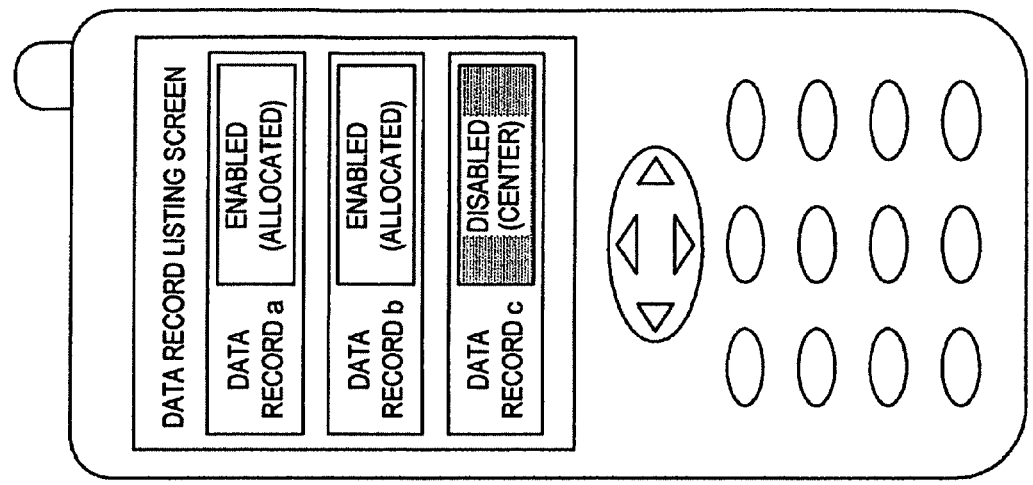
FIG. 8 is an explanatory figure for explaining an example of a transfer procedure according to the second embodiment of the present invention that transfers an execution data item from a second storage portion to a control information processing device.
Figure 8B:
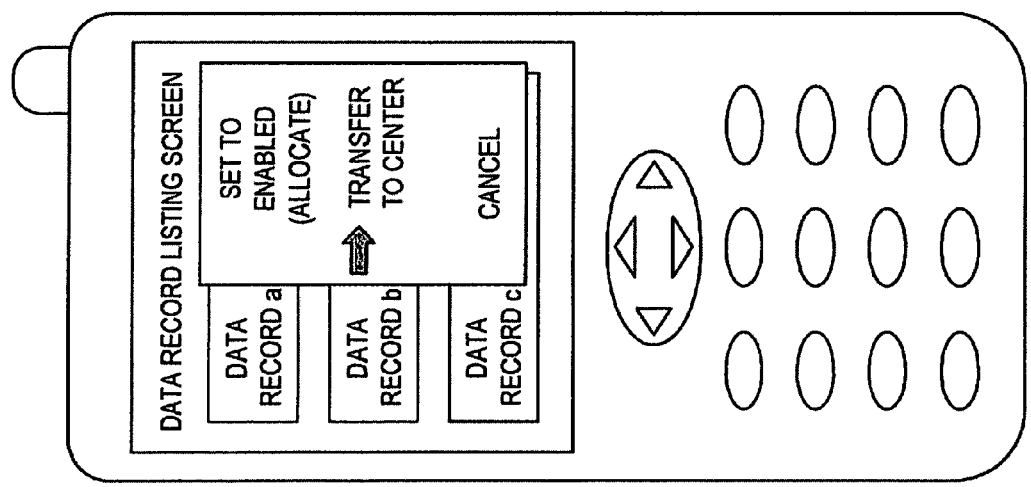
Figure 8A:
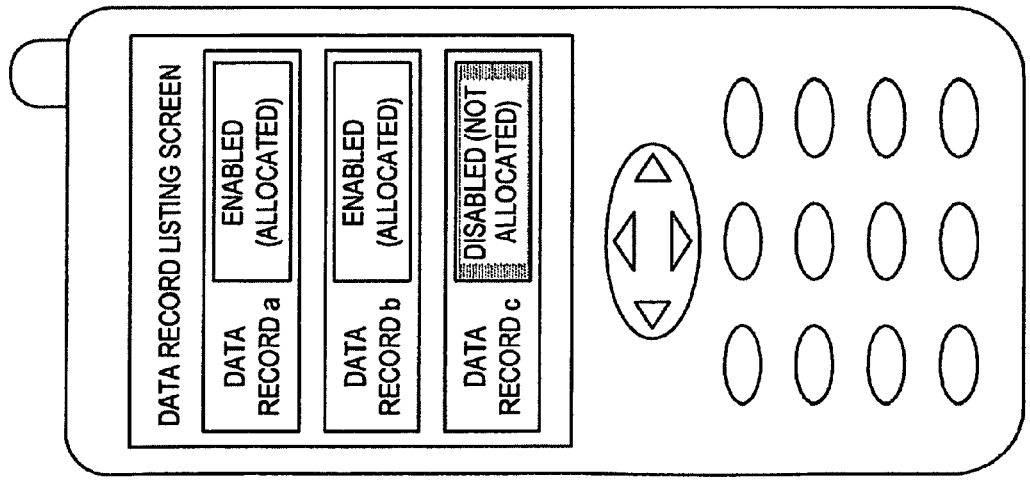

FIG. 8A is a figure that shows the state of the execution data item c 126 before the transfer, which is the state (3) described above.

(ii) Selection of the Execution Data Item to be Transferred and Determination of a Transfer Destination FIG. 8B shows an example of a procedure for selecting the execution data item to be transferred and determining a transfer destination. For example, if the user selects the data record c 128 by pressing various buttons, a menu screen is displayed that shows the transfer destination, in the same manner as that shown in FIGS. 3B and 4B. If the user selects the transfer destination "Transfer to center" on the menu screen, such as by pressing various buttons, for example, a transfer command that indicates the selected execution data item and the transfer destination is transmitted to the data transfer portion 204. Then, based on the transfer command, the data transfer portion 204 communicates with the control information processing device 250 through the second communication portion 202 and transmits the execution data item c 126 and the data record c 128 from the second storage portion 110 to the control information processing device 250.

Case where the Execution Data Item is Stored in the Control Information Processing Device 250

If, after the transmission processing for the execution data item c 126 and the data record c 128, for example, the data transfer portion 204 receives from the control information processing device 250 a completion notification (a first completion notification) to the effect that the transmitted execution data item c 126 and data record c 128 have been stored in the control side storage portion 252, the data transfer portion 204 determines that the transfer of the execution data item c 126 was carried out in a normal manner. The data transfer portion 204 then deletes the execution data item c 126 and the data record c 128 that are stored in the second storage portion 110, thus completing the data transfer. Note that the deletion of the execution data item c 126 and the data record c 128 can be performed by the data transfer portion 204, for example, but this example is not limiting, and the deletion may obviously be performed by another structural element, such as a control portion (not shown in the drawings) or the like.

Case where the Execution Data Item is not Stored in the Control Information Processing Device 250

On the other hand, if, after the transmission processing for the execution data item c 126 and the data record c 128, for example, the data transfer portion 204 does not receive from the control information processing device 250, within a predetermined time, the completion notification (the first completion notification) to the effect that the transmitted execution data item c 126 and data record c 128 have been stored in the control side storage portion 252, the data transfer portion 204 determines that the transfer of the execution data item c 126 was not carried out in a normal manner. In a case where with the data transfer portion 204 determines that the transfer of the execution data item c 126 was not carried out in a normal manner, the data transfer portion 204 does not delete the execution data item c 126 and the data record c 128 that are stored in the second storage portion 110. Therefore, in the information processing terminal 200, the state of the execution data item c 126 before the transfer, that is, the state (3) described above, is maintained. Note that the data transfer portion 204 may also display an error on a transfer selection portion 114 at this time.

(iii) State of the Execution Data Item c 126 After the Transfer

FIG. 8C is a figure that shows the state of the execution data item c 126 after the transfer. The transfer of the execution data item c 126 and the data record c 128 by the data transfer portion 204 from the second storage portion 110 to the control side storage portion 252 brings into being the state (4) described above.

Further, as shown in FIG. 8C, the status of the data record c 128 has changed from "Disabled (Not allocated)" to "Disabled (Center)". Therefore, by displaying the statuses of the individual data records, the information processing terminal 200 can notify the user as to whether or not the function or service that corresponds to each data record is enabled, as well as notify the user of the storage location of the execution data item that corresponds to each data record.

Second Example of an Execution Data Item Transfer Procedure According to the Second Embodiment: Download of the Execution Data Item from the Control Information Processing Device 250

Next, a case in which the storage state of the execution data item is changed from the state (4) shown in FIG. 8C to the state (3) will be explained with reference to FIG. 9. FIG. 9 is an explanatory figure for explaining an example of a transfer procedure according to the second embodiment of the present invention that transfers the execution data item from the control side storage portion 252 to the second storage portion 110.

(i) State of the Execution Data Item c 126 Before the Transfer

FIG. 9A is a figure that shows the state of the execution data item c 126 before the transfer, which is the state (4) described above.

(ii) Selection of the Execution Data Item to be Transferred and Determination of the Transfer Destination FIG. 9B shows an example of a procedure for selecting the execution data item to be transferred and determining the transfer destination. For example, if the user selects the data record c 128 by pressing various buttons, a menu screen is displayed that shows the transfer destination, in the same manner as that shown in FIG. 8. If the user selects the transfer destination "Download" on the menu screen, such as by pressing various buttons, for example, a transfer command that indicates the selected execution data item and the transfer destination is transmitted to the data transfer portion 204. Then, based on the transfer command, the data transfer portion 204 communicates with the control information processing device 250 through the second communication portion 202, receives the execution data item c 126 and the data record c 128 from the control information processing device 250, and stores the execution data item c 126 and the data record c 128 in the second storage portion 110.

Case where the Execution Data Item is Stored in the Second Storage Portion 110

After the execution data item c 126 and the data record c 128 are stored in the second storage portion 110, for example, the data transfer portion 204 can transmit to the control information processing device 250 a completion notification (a second completion notification) to the effect that the execution data item c 126 has been stored. Then the control information processing device 250, having received the second completion notification, deletes the execution data item c 126 and the data record c 128 that are stored in the control side storage portion 252, thus completing the data transfer.

Case where the Execution Data Item is not Stored in the Second Storage Portion 110

On the other hand, in a case where the execution data item c 126 is not stored in the second storage portion 110, such as when the execution data item c 126 and the data record c 128 could not be received, or when the execution data item c 126 and the data record c 128 could not be stored in the second storage portion 110, for example, the data transfer portion 204 does not transmit to the control information processing device 250 the completion notification (the second completion notification) to the effect that the execution data item c 126 has been stored. The data transfer portion 204 may also display an error on the transfer selection portion 114 at this time.

In a case where the control information processing device 250 does not receive the second completion notification within a predetermined time, the control information processing device 250 can determine that the transfer of the execution data item c 126 was not carried out in a normal manner. In a case where with the control information processing device 250 determines that the transfer of the execution data item c 126 was not carried out in a normal manner, the control information processing device 250 does not delete the execution data item c 126 and the data record c 128 that are stored in the control side storage portion 252. Therefore, in the information processing terminal 200 and in the control information processing device 250, the state of the execution data item c 126 before the transfer, that is, the state (4) described above, is maintained.

(iii) State of the Execution Data Item c 126 After the Transfer

FIG. 9C is a figure that shows the state of the execution data item c 126 after the transfer. The transfer of the execution data item c 126 and the data record c 128 by the data transfer portion 204 from the control side storage portion 252 to the second storage portion 110 brings into being the state (3) described above.

Further, as shown in FIG. 9C, the status of the data record c 128 has changed from "Disabled (Center)" to "Disabled (Not allocated)". Therefore, by displaying the statuses of the individual data records, the information processing terminal 200 can notify the user as to whether or not the function or service that corresponds to each data record is enabled, as well as notify the user of the storage location of the execution data item that corresponds to each data record.

Other Examples of Execution Data Item Transfer Procedures According to the Second Embodiment The transfer of the execution data item between the second storage portion 110 and the control information processing device 250 has been explained above using the first and second examples of the execution data item transfer procedure according to the second embodiment. However, the transfer of the execution data item between the first storage portion 108 and the control information processing device 250 can be carried out in the same manner. Note that in a case where the execution data item is transferred between the first storage portion 108 and the control information processing device 250, an external device (a remote server, not shown in the drawings) that can access the first storage portion 108 within a tamper-resistant IC chip 102 can delete the execution data item from the first storage portion 108, store the execution data item in the first storage portion 108, and the like.

As explained with reference to FIGS. 8 and 9, the user's operation of the transfer selection portion 114, for example, can cause the transfer command, which indicates the execution data item to be transferred and the transfer destination, to be transmitted to the data transfer portion 204, such that the data transfer portion 204 can transfer the execution data item based on the transfer command. Therefore, being provided with the data transfer portion 204 enables the information processing terminal 200 according to the second embodiment of the present invention to transfer the execution data item to an arbitrarily assigned area in the first storage portion 108 and to an arbitrarily assigned area in the control information processing device 250.

However, in a case where the execution data item is transferred to an arbitrarily assigned area in the first storage portion 108, the information processing terminal 200 cannot identify the area in the first storage portion 108 in which the execution data item that the reader/writer 150 reads or writes is stored. Therefore, even if the execution data item is stored in the first storage portion 108, the possibility exists that the function or service that corresponds to the execution data item cannot be enabled. Moreover, because the execution data item is also stored in the control information processing device 250, which is a device that is external to the information processing terminal 200, the possibility also exists that the data transfer portion 204 will not be able to identify the storage location of the execution data item that is indicated by the transfer command.

Example of Control of the Execution Data Item in the Data Transfer Portion 204

Accordingly, the information processing terminal 200 according to the second embodiment of the present invention controls the execution data item as described in sections (C) and (D) below, for example.

(C) Control Using an Address Area

In order to identify the execution data item that the reader/writer 150 reads or writes, for example, the information processing terminal 200, in the same manner as the information processing terminal 100 according to the first embodiment, can be provided with an address area in the first storage portion 108 that stores the location (numbered area) where the execution data item is stored in the first storage portion 108.

If the address area is provided in the first storage portion 108 and if the information in the address area is updated appropriately when the execution data items are transferred, then when the reader/writer 150 reads one of the execution data items, for example, the reader/writer 150 will be able to read a specific execution data item.

(D) Control Using a Control Table

The information processing terminal 200, in the same manner as the information processing terminal 100 according to the first embodiment, can also use a control table like that shown in FIG. 10, for example, to control each of the execution data items in conjunction with the transfer of the execution data items to the arbitrarily assigned areas. FIG. 10 is an explanatory figure that shows an example of the control table according to the second embodiment of the present invention.

As in the control table according to the first embodiment shown in FIG. 5, each line of the control table according to the second embodiment of the present invention corresponds to one function or service, and the control table contains at least location information that indicates the location where each of the execution data items is stored. In FIG. 10, the STORAGE SITE and the STORAGE LOCATION IN FIRST STORAGE PORTION fall under the category of the location information. A difference between the control table according to the second embodiment and the control table according to the first embodiment shown in FIG. 5 is that the control table according to the second embodiment can also store, as the location information, information that indicates the control information processing device 250.

When transferring the execution data item, the data transfer portion 204 can determine where to store the execution data item by referring to the location information in the control table. After the execution data item has been stored, the data transfer portion 204 can update the transfer destination with the location information for the transferred execution data item. In the same manner as the data transfer portion 112 according to the first embodiment, the data transfer portion 204 can also update the address area that is provided in the first storage portion 108 after the execution data item has been stored. The updating of the address area that is provided in the first storage portion 108 may be performed by the data transfer portion 204, and it can also be performed by an IC chip control portion (not shown in the drawings) that is provided in the IC chip 102. Accordingly, in a case where the execution data item has been stored in the first storage portion 108, the execution data item information that is stored in the address area that is provided in the first storage portion 108 will match the contents of the location information in the control table.

It is therefore possible for the information processing terminal 200 to control where the execution data item is stored, so the information processing terminal 200 can transfer the execution data item to an arbitrarily assigned area and can also uniquely identify the execution data item that the reader/writer 150 reads and writes even if the execution data item has been transferred to an arbitrarily assigned area. The information processing terminal 200 can also identify the location where the execution data item is stored even if the execution data item that is indicated by the transfer command is stored in the control information processing device 250.

Thus the information processing terminal 200 according to the second embodiment of the present invention is provided with the first storage portion 108 within the IC chip 102, the second storage portion 110 outside the IC chip 102, the second communication portion 202, and the data transfer portion 204. Data can be read from and written to the first storage portion 108 based on various commands from the reader/writer 150. Data cannot be read from and written to the second storage portion 110 based on various commands from the reader/writer 150. The second communication portion 202 is capable of communication with the control information processing device 250. The data transfer portion 204 transfers data based on a user input. Accordingly, it is possible for the information processing terminal 200 (1) to transfer the execution data item freely between the first storage portion 108 and the second storage portion 110, (2) to transfer the execution data item freely between the first storage portion 108 and the control side storage portion 252 of the control information processing device 250, and (3) to transfer the execution data item freely between the second storage portion 110 and the control side storage portion 252 of the control information processing device 250, whichever the user selects. The user of the information processing terminal 200 according to the second embodiment of the present invention can therefore freely enable and disable the functions and services that correspond to the respective execution data items.

Moreover, in the same manner as the information processing terminal 100 according to the first embodiment, the information processing terminal 200 according to the second embodiment of the present invention does not have to delete the execution data items as the known information processing terminal 10 does, even in a case where no vacant area exists in the first storage portion 108. Accordingly, even in a case where an execution data item that is transferred from the first storage portion 108 is stored once again in the first storage portion 108, the user does not have to perform an operation such as a user registration or the like in order to use the service that corresponds to the execution data item, for example. Therefore, a burden such as the known information processing terminal 10 imposes is not imposed on the user of the information processing terminal 200 according to the second embodiment of the present invention, even in a case where a disabled function or service is once again enabled, and the user-friendliness of the information processing terminal 200 is not impaired.

Furthermore, in the same manner as the information processing terminal 100 according to the first embodiment, the information processing terminal 200 according to the second embodiment of the present invention can control the location information that indicates the locations where the individual execution data items are stored. Therefore, the information processing terminal 200 according to the second embodiment of the present invention can transfer the execution data item to an arbitrarily assigned area and can also uniquely identify the location where the execution data item that the reader/writer 150 reads and writes is stored, even though the execution data item has been transferred to an arbitrarily assigned area. The information processing terminal 200 can also identify the location where the execution data item is stored even if the execution data item that is indicated by the transfer command is stored in the control information processing device 250.

The second embodiment of the present invention has been explained using the information processing terminal 200 as an example, but the second embodiment of the present invention is not limited to this example. The second embodiment of the present invention can also be used in a mobile communication device such as a mobile telephone or the like that is provided with an IC chip, as well as in a computer or the like, such as a ultra mobile personal computer (UMPC) or the like that is provided with an IC chip.

Furthermore, the control information processing device 250 has been explained as a configuring element of the system that includes the information processing terminal 200 according to the second embodiment, but the second embodiment of the present invention is not limited to this example. The second embodiment of the present invention can also be used in a computer or the like, such as a personal computer (PC), a server, or the like.

Program According to the Second Embodiment

A program that causes the information processing terminal 200 according to the second embodiment to function as a computer can allocate data selectively, according to a user input, to a storage portion from and to which a reader/writer can read and write.

Data Transfer Method According to the Second Embodiment

Next, a data transfer method according to the second embodiment of the present invention will be explained. FIG. 11 is a flowchart that shows an example of the data transfer method according to the second embodiment of the present invention. Note that in FIG. 11, "first storage portion" denotes a storage portion within an IC chip, from and to which data can be read and written based on various commands from a reader/writer, and "second storage portion" denotes a storage portion outside the IC chip, from and to which data cannot be read and written based on various commands from the reader/writer. Therefore, in a case where the execution data item is stored in the first storage portion, the function or service that corresponds to the execution data item is in the enabled state.

The method determines whether or not a transfer command for the execution data item has been detected (step S200). If the transfer command is not detected at step S200, the method repeats step S200 until the transfer command is detected.

If the transfer command is detected at step S200, the method determines whether or not the execution data item indicated by the transfer command is stored in the first storage portion, in order to identify the location where the execution data item is stored (step S202). The determination at step S202 can be made by referring to the control table, for example, in which is recorded the location information that indicates the location where the execution data item is stored.

If it is determined at step S202 that the execution data item indicated by the transfer command is stored in the first storage portion, the method then determines whether or not the execution data item will be set to disabled (step S204). The determination at step S204 can be made according to whether or not information on the transfer destination is included in the transfer command, for example.

In a case where it is determined at step S204 that the execution data item indicated by the transfer command will not be set to disabled, the method does not transfer the execution data item indicated by the transfer command (step S212), then updates the location information with information that indicates the location where the execution data item indicated by the transfer command is stored, that is, the first storage portion (step S232). In conjunction with the updating of the location information at step S232, information can also be updated for the first storage portion address area that is associated with the transferred execution data item. Note that in FIG. 11, an example is shown in which the location information is updated even when the execution data item is not transferred, but the data transfer method according to the second embodiment is not limited to this example. For example, like the data transfer method according to the first embodiment shown in FIG. 6, the data transfer method according to the second embodiment may also not update the location information when the execution data item is not transferred. The same also applies to the update for the address area.

In a case where it is determined at step S204 that the execution data item indicated by the transfer command will be set to disabled, the method determines whether or not the execution data item indicated by the transfer command will be transferred to the control information processing device (step S206). The determination at step S206 can be made by using the transfer destination information that is included in the transfer command, for example.

In a case where it is determined at step S206 that the execution data item will be transferred to the control information processing device, the execution data item indicated by the transfer command is transferred from the first storage portion to the control information processing device (step S208), and the location information for the transferred execution data item is updated from the first storage portion to the control information processing device (step S232). In conjunction with the updating of the location information at step S232, information can also be updated (for example, deleted) for the first storage portion address area that is associated with the transferred execution data item. Note that the transfer at step S208 can be completed when, for example, a completion notification (a first completion notification) is received to the effect that the execution data item has been transmitted to the control information processing device and that the execution data item has been stored in the control information processing device.

Further, in a case where the first completion notification is not received, for example, the transfer of the execution data item at step S208 is treated as not having been carried out in a normal manner, and the storage state of the execution data item prior to the transfer is maintained. Then at step S232, the location information is updated with information that indicates the location where the execution data item indicated by the transfer command is stored, that is, the first storage portion (step S232). In this case, it is acceptable not to update the information on the first storage portion address area, because the transfer of the execution data item was not carried out in a normal manner.

In a case where it is determined at step S206 that the execution data item will not be transferred to the control information processing device, the execution data item indicated by the transfer command is transferred from the first storage portion to the second storage portion (step S210), and the location information for the transferred execution data item is updated from the first storage portion to the second storage portion (step S232). In conjunction with the updating of the location information at step S232, information can also be updated (for example, deleted) for the first storage portion address area that is associated with the transferred execution data item.

If it is determined at step S202 that the execution data item indicated by the transfer command is not stored in the first storage portion, the method then determines whether or not the execution data item indicated by the transfer command is not stored in the second storage portion (step S214). The determination at step S214 can be made in the same manner as is done at step S202, by referring to the control table, for example, in which is recorded the location information that indicates the location where the execution data item is stored.

If it is determined at step S214 that the execution data item indicated by the transfer command is stored in the second storage portion, the method then determines whether or not the execution data item will be set to enabled (step S216). The determination at step S216 can be made in the same manner as is done at step S204, according to whether or not information on the transfer destination is included in the transfer command, for example.

In a case where it is determined at step S216 that the execution data item indicated by the transfer command will be set to enabled, the execution data item indicated by the transfer command is transferred from the second storage portion to the first storage portion (step S218), and the location information for the transferred execution data item is updated from the second storage portion to the first storage portion (step S232). In conjunction with the updating of the location information at step S232, information can also be updated (for example, added) for the first storage portion address area that is associated with the transferred execution data item.

In a case where it is determined at step S216 that the execution data item indicated by the transfer command will not be set to enabled, the method determines whether or not the execution data item indicated by the transfer command will be transferred to the control information processing device (step S220). The determination at step S220 can be made in the same manner as is done at step S206, by using the transfer destination information that is included in the transfer command, for example.

In a case where it is determined at step S220 that the execution data item will be transferred to the control information processing device, the execution data item indicated by the transfer command is transferred from the second storage portion to the control information processing device (step S222), and the location information for the transferred execution data item is updated from the second storage portion to the control information processing device (step S232). Note that the transfer at step S222 can be completed in the same manner as is done at step S208, when, for example, a completion notification (a first completion notification) is received to the effect that the execution data item has been transmitted to the control information processing device and that the execution data item has been stored in the control information processing device. In this case, it is acceptable not to update the information on the first storage portion address area, because neither the transfer source nor the transfer destination for the execution data item is the first storage portion.

Further, in a case where the first completion notification is not received, for example, the transfer of the execution data item at step S222 is treated as not having been carried out in a normal manner, and the storage state of the execution data item prior to the transfer is maintained, in the same manner as is done at step S208. Then at step S232, the location information is updated with information that indicates the location where the execution data item indicated by the transfer command is stored, that is, the second storage portion (step S232).

In a case where it is determined at step S220 that the execution data item will be transferred to the control information processing device, the method does not transfer the execution data item (step S212), then updates the location information with information that indicates the location where the execution data item indicated by the transfer command is stored, that is, the second storage portion (step S232).

If it is determined at step S214 that the execution data item indicated by the transfer command is not stored in the second storage portion, the method then communicates with the control information processing device and acquires the execution data item indicated by the transfer command from the control information processing device (step S224).

The method then determines whether or not the execution data item that was acquired from the control information processing device at step S224 will be set to enabled (step S226). The determination at step S226 can be made in the same manner as is done at step S216, according to whether or not information on the transfer destination is included in the transfer command, for example.

In a case where it is determined at step S226 that the execution data item indicated by the transfer command will be set to enabled, the execution data item indicated by the transfer command, which was acquired from the control information processing device, is transferred to the first storage portion (step S228), and the location information for the transferred execution data item is updated from the control information processing device to the first storage portion (step S232). In conjunction with the updating of the location information at step S232, information can also be updated (for example, added) for the first storage portion address area that is associated with the transferred execution data item. Note that the transfer at step S228 can be completed when, for example, a completion notification (a second completion notification) is transmitted to the control information processing device to the effect that the execution data item indicated by the transfer command, which was acquired from the control information processing device, has been stored in the first storage portion and that the storage has been completed.

In a case where the execution data item indicated by the transfer command could not be acquired from the control information processing device, for example, as well as in a case where the execution data item indicated by the transfer command, which was acquired from the control information processing device, could not be stored in the first storage portion, the transfer at step S228 is not completed, and the completion notification (the second completion notification) to the effect that the storage was completed is not transmitted to the control information processing device. In this case, the control information processing device treats the transfer of the execution data item as not having been carried out in a normal manner, and maintains the storage state of the execution data item prior to the transfer. Then at step S232, the location information is updated with information that indicates the location where the execution data item indicated by the transfer command is stored, that is, the control information processing device (step S232). In this case, it is acceptable not to update the information on the first storage portion address area, because the transfer of the execution data item was not carried out in a normal manner.

In a case where it is determined at step S226 that the execution data item indicated by the transfer command will not be set to enabled, the execution data item indicated by the transfer command, which was acquired from the control information processing device, is transferred to the second storage portion (step S230), and the location information for the transferred execution data item is updated from the control information processing device to the second storage portion (step S232). Note that the transfer at step S230 can be completed when, for example, the completion notification (the second completion notification) is transmitted to the control information processing device to the effect that the execution data item indicated by the transfer command, which was acquired from the control information processing device, has been stored in the second storage portion and that the storage has been completed.

In a case where the execution data item indicated by the transfer command could not be acquired from the control information processing device, for example, as well as in a case where the execution data item indicated by the transfer command, which was acquired from the control information processing device, could not be stored in the second storage portion, the transfer at step S230 is not completed and the completion notification (the second completion notification) to the effect that the storage was completed is not transmitted to the control information processing device, in the same manner as at step S228. In this case, the control information processing device treats the transfer of the execution data item as not having been carried out in a normal manner, and maintains the storage state of the execution data item prior to the transfer. Then at step S232, the location information is updated with information that indicates the location where the execution data item indicated by the transfer command is stored, that is, the control information processing device (step S232).

Thus, based on the transfer command that indicates the execution data item to be transferred and the transfer destination, it is possible for the data transfer method according to the second embodiment of the present invention (1) to transfer the execution data item between the first storage portion 108 and the second storage portion 110, (2) to transfer the execution data item between the first storage portion 108 and the control information processing device 250, and (3) to transfer the execution data item between the second storage portion 110 and the control information processing device 250.

The transfer command can be created by a user operation (the user input), for example. Therefore, using the data transfer method according to the second embodiment of the present invention makes it possible to allocate the execution data item selectively, according to the user input, to the storage portion from and to which the reader/writer can read and write.

Furthermore, the data transfer method according to the second embodiment of the present invention, at the time that the execution data item is transferred, can update the location information that indicates the location where the execution data item is stored, in the same manner as is done by the data transfer method according to the first embodiment. Therefore, using the data transfer method according to the second embodiment of the present invention makes it possible to transfer the execution data item to an arbitrarily assigned area and also makes it possible to identify uniquely the location where the execution data item that the reader/writer reads and writes is stored, even if the execution data item has been transferred to an arbitrarily assigned area. Using the data transfer method according to the second embodiment of the present invention also makes it possible to identify the location where the execution data item is stored even if the execution data item that is indicated by the transfer command is stored in the control information processing device 250.

Third Embodiment

Configurations for the information processing terminals according to the first and second embodiments were explained above that perform communication with an external device such as a reader/writer or the like. However, the information processing terminals according to the embodiments of present invention are not limited to a devices that perform communication with an external device. Accordingly, an information processing terminal according to a third embodiment of the present invention will be explained next that is a single unit, that is, a device that functions in a stand-alone state.

Like the information processing terminals according to the first and second embodiments, the information processing terminal according to the third embodiment can include a first storage portion, a second storage portion, a data transfer portion, a transfer selection portion, and a data acquisition portion.

The first storage portion of the information processing terminal according to the third embodiment is a storage portion that stores the stored execution data item in an enabled state, that is, a state in which the execution data item functions. The second storage portion of the information processing terminal according to the third embodiment is a storage portion that stores the stored execution data item in a disabled state, that is, a state in which the execution data item does not function.

In the same manner as in the information processing terminals according to the first and second embodiments, the data transfer portion of the information processing terminal according to the third embodiment transfers the execution data item between the first storage portion and the second storage portion based on a transfer command.

In the same manner as in the information processing terminals according to the first and second embodiments, the transfer selection portion of the information processing terminal according to the third embodiment is an interface for allowing a user to select the execution data item to be transferred and to select a transfer destination for the selected execution data item. The user selections enable the transfer selection portion to create the transfer command, which indicates the selected execution data item and the transfer destination.

The data acquisition portion of the information processing terminal according to the third embodiment is a portion for acquiring the execution data item and the data record that is related to the execution data item and for storing the execution data item and the data record in the information processing terminal. The data acquisition portion of the information processing terminal according to the third embodiment can acquire the execution data item and the data record that is related to the execution data item from removable media such as a magnetic storage medium, a non-volatile memory such as a flash memory and the like, a magneto optical disk, and the like, for example.

The configuration described above makes it possible for the information processing terminal according to the third embodiment to transfer the execution data item freely between the first storage portion and the second storage portion according to the user's selection. Therefore, even in a stand-alone state, the information processing terminal according to the third embodiment makes it possible for the user to enable and disable at will the functions that correspond to the individual execution data items, in the same manner as is done in the information processing terminals according to the first and second embodiments.

Program According to the Third Embodiment

A program that causes the information processing terminal according to the third embodiment to function as a computer can allocate data selectively, according to a user input, to a storage portion where the stored execution data item will be in an enabled state.

Fourth Embodiment

Configurations for the information processing terminals according to the first and second embodiments were explained above in which the information processing terminals each contain one IC chip, that is, configurations in which the information processing terminals each have one storage portion (the first storage portion) within the IC chip from and to which the reader/writer can read and write. However, the information processing terminals according to the embodiments of present invention are not limited to configurations that contain one IC chip, and they may also include a plurality of IC chips, each of which has a storage portion within it from and to which the reader/writer can read and write.

Even in such a configuration, an information processing terminal according to a fourth embodiment has basically the same configuration as the information processing terminals according to the first and second embodiments, so the information processing terminal according to the fourth embodiment can freely transfer the execution data item between a plurality of the first storage portions and the second storage portion according to a user's selection. Therefore, the information processing terminal according to the fourth embodiment of the present invention makes it possible for the user to enable and disable at will the functions that correspond to the individual execution data items, in the same manner as is done in the information processing terminals according to the first and second embodiments.

Example of Use of the Information Processing Terminal According to the Fourth Embodiment: Configuration that has a Plurality of SIM Chips A mobile telephone that is provided with a plurality of Subscriber Identity Module (SIM) chips can be cited as an example of the use of the information processing terminal according to the fourth embodiment. Because the information processing terminal according to the fourth embodiment can freely transfer the execution data item according to the user's selection, the user can allocate data (the execution data item) that enables a SIM chip to any SIM chip that the user selects, such as by pressing various buttons on the mobile telephone, for example. The user can therefore selectively use different telephone numbers that respectively correspond to different SIM chips, for example.

Program According to the Fourth Embodiment

A program that causes the information processing terminal according to the fourth embodiment to function as a computer can allocate data selectively, according to a user input, to a storage portion from and to which a reader/writer can read and write.

It should be understood by those skilled in the art that various modifications, combinations, sub-combinations and alterations may occur depending on design requirements and other factors insofar as they are within the scope of the appended claims or the equivalents thereof.

For example, the information processing terminals according to the first and second embodiments, shown in FIGS. 2 and 7, are configured such that the user-operable transfer selection portions 114 are provided within the information processing terminals 100, 200. However, the information processing terminals according to the embodiments of present invention are not limited to this configuration. The transfer selection portion can be provided as an operation device that is separate from the information processing terminal and can transmit the transfer command to the data transfer portion using wireless communication or wire communication. Even in such a configuration, the information processing terminal can freely transfer the execution data item between a first storage portion and a second storage portion according to a user's selection, making it possible for the user to enable and disable at will the functions that correspond to the individual execution data items.

The configurations described above are illustrative examples of the embodiments of the present invention and are naturally within the technological scope of the present invention.

What is claimed is:

1. An information processing terminal provided with an IC chip that is capable of non-contact communication with a reader/writer through a first communication portion using a magnetic field, comprising:
   a first storage portion that is tamper-proof that is provided within the IC chip and that is capable of storing at least one type of data item that is used by the IC chip, wherein the stored data item corresponds to another function performed by the information processing terminal or another service that the information processing terminal can receive;
   a second storage portion that is disposed outside the IC chip, wherein the reader/writer is not capable of reading data from or writing data to the second storage portion through the first communication portion;
   a data transfer portion that transfers the data item between the first storage portion and the second storage portion in accordance with a user input, wherein the data transfer portion is separate from the first communication portion and is not capable of communicating with the reader/writer and the data transfer portion identifies the data item that will be transferred based on location information for each data item that indicates the location where the data item is stored, said location information being stored in a third storage portion disposed in the data transfer portion and outside the IC chip; and
   a second communication portion that performs communication with a control information processing device that is capable of storing the data item,
   wherein the data transfer portion can transfer the data item between the second storage portion and the control information processing device.

2. The information processing terminal according to claim 1, wherein the data transfer portion updates the location information for the transferred data item.

3. The information processing terminal according to claim 1,
   wherein the data transfer portion can transfer the data item between the first storage portion and the control information processing device.

4. The information processing terminal according to claim 3, wherein,
   in a case where the data item is transferred from the first storage portion to the control information processing device, and
   in a case where the data item is transferred from the second storage portion to the control information processing device, the data transfer portion deletes the data item at the location from which the data item was transferred, based on a first completion notification that is transmitted from the control information processing device and that indicates that the storage of the data item in the control information processing device has been completed.

5. The information processing terminal according to claim 3, wherein,
   in a case where the data item is transferred from the control information processing device to first storage portion, and
   in a case where the data item is transferred from the control information processing device to second storage portion,
   the data transfer portion transmits to the control information processing device a second completion notification that indicates that the data item has been stored in at least one of the first storage portion and the second storage portion and that the storage of the data item has been completed.

6. The information processing terminal according to claim 1, further comprising:
   a data acquisition portion that acquires the data item from an external device,
   wherein the data acquisition portion stores the acquired data item in the second storage portion.

7. The information processing terminal according to claim 1, wherein the data item is a data item that is transmitted from the reader/writer.

8. The information processing terminal according to claim 1, wherein the information processing terminal is a mobile communication device.

9. A data transfer method used in an information processing terminal that is provided with an IC chip that is capable of non-contact communication with a reader/writer through a communication portion using a magnetic field, a first storage portion that is tramper-proof that is provided within the IC chip and that is capable of storing at least one type of data item that is used by the IC chip where the data item to be selectively allocated by the user input to the storage portion from and to which the reader/writer can read and write, wherein the stored data item corresponds to another function performed by the information processing terminal or another service that the information processing terminal can receive, and a second storage portion that is disposed outside the IC chip, wherein the reader/writer is not capable of reading data from or writing data to the second storage portion through the communication portion, the data transfer method comprising the steps of:
   specifying, in accordance with a user input, the data item that will be transferred and the storage portion that will be a transfer destination where the data item that will be transferred will be stored; and
   transferring the specified data item to the storage portion that is the transfer destination using a data transfer portion that is separate from the communication portion and that is not capable of communicating with the reader/writer, wherein the data transfer portion identifies the specified data item based on location information for the specified data item that indicates the location where the specified data item is stored, said location information being stored in a third storage portion disposed in the data transfer portion and outside the IC chip,
   a second communication portion that performs communication with a control information processing device that is capable of storing the data item,
   wherein the data transfer portion can transfer the data item between the second storage portion and the control information processing device.

10. A non-transitory computer-readable medium storing a program for an information processing terminal that is provided with an IC chip that is capable of non-contact communication with a reader/writer through a communication portion using a magnetic field, a first storage portion that is tamper-proof that is provided within the IC chip and that is capable of storing at least one type of data item that is used by the IC chip, wherein the stored data item corresponds to another function performed by the information processing terminal or another service that the information processing terminal can receive, and a second storage portion that is disposed outside the IC chip, wherein the reader/writer is not capable of reading data from or writing data to the second storage portion through the communication portion, the program comprising instructions that command a computer to function as:
- a portion that specifies, in accordance with a user input, the data item that will be transferred and the storage portion that will be a transfer destination where the data item that will be transferred will be stored; and
- a portion that transfers the specified data item to the storage portion that is the transfer destination, wherein the portion that transfers the specified data item is separate from the communication portion and is not capable of communicating with the reader/writer wherein the portion that transfers the specified data item identifies the specified data item based on location information for the specified data item that indicates the location where the specified data item is stored, said location information being stored in a third storage portion disposed in the data transfer portion and outside the IC chip; and
- a second communication portion that performs communication with a control information processing device that is capable of storing the data item,
- wherein the data transfer portion can transfer the data item between the second storage portion and the control information processing device.

* * * * *